US009330050B2

(12) United States Patent
Chalupa et al.

(10) Patent No.: US 9,330,050 B2
(45) Date of Patent: May 3, 2016

(54) DEPLOYMENT WIZARD

(75) Inventors: Andreas Chalupa, Methuen, MA (US); Christine Chipolone, Framingham, MA (US)

(73) Assignee: Aspect Software, Inc., Lombard, IL (US)

( * ) Notice: Subject to any disclaimer, the term of this patent is extended or adjusted under 35 U.S.C. 154(b) by 293 days.

(21) Appl. No.: 11/865,923

(22) Filed: Oct. 2, 2007

(65) Prior Publication Data
US 2009/0089407 A1 Apr. 2, 2009

(51) Int. Cl.
*G06F 15/177* (2006.01)
*G06F 15/173* (2006.01)
*G06F 15/16* (2006.01)
*G06F 9/445* (2006.01)

(52) U.S. Cl.
CPC ..................................... *G06F 15/16* (2013.01)

(58) Field of Classification Search
CPC ... G06F 17/30654; G06F 11/30; G06F 21/50; H04L 67/108; H04L 12/2602; H04L 43/18; H04L 41/0806; H04L 47/125; H04L 67/22

USPC ..................................... 709/220–223; 717/11
See application file for complete search history.

(56) References Cited

U.S. PATENT DOCUMENTS

| 7,472,352 B2 * | 12/2008 | Liversidge et al. ............ 715/758 |
| 2005/0125513 A1 * | 6/2005 | Sin-Ling Lam et al. ....... 709/220 |
| 2006/0015589 A1 * | 1/2006 | Ang et al. ..................... 709/220 |
| 2009/0019137 A1 * | 1/2009 | Mishra et al. ................. 709/220 |

* cited by examiner

*Primary Examiner* — Djenane Bayard
*Assistant Examiner* — Farrukh Hussain
(74) *Attorney, Agent, or Firm* — Husch Blackwell, LLP

(57) ABSTRACT

A method and apparatus are provided for collecting deployment information from a user for a multi-tier computer system. The method includes the steps of receiving a deployment size of the multi-tier system from the user and identifying a set of virtual appliances by function based upon the deployment size received from the user. The method further includes the steps of prompting the user for a name for each identified virtual appliance, collecting network information of each virtual appliance based upon the name and generating a deployment configuration file for a mandatory virtual appliance of the set of virtual appliances.

45 Claims, 31 Drawing Sheets

DEPLOYMENT WIZARD

FIELD OF THE INVENTION

The field of the invention relates to computers and more particularly to the programming of computers.

BACKGROUND OF THE INVENTION

Computer systems have become a virtual necessity for the operation of any relatively large organization. For financial, membership or even asset information, there is no other device capable of tracking the activities of geographically diverse organizational operations administered by different people, possibly using different languages.

A computer system used by an organization will typically be provided with a number of databases to administer and track organizational activities. For example, one database may be provided for financial information (e.g., accounts receivable, accounts payable, etc.), another database may be provided to track progress towards organizational objectives (e.g., manufactured product, raw materials, etc.) and still another database may be provided to track organization membership (e.g., human resources, etc.).

A respective server may be provided as an interface between organizational members and the organizational databases. Where the needs for different parts of the organization are different (e.g., language), then an application specific interface (API) may be used to standardize a server interface to a common format.

Due to changing business conditions or otherwise, software components and systems eventually becomes outdated and must be updated or replaced. While the process may be relatively simple in the case of a personal computer, the process becomes considerably more complicated in networked systems having many servers and dependent applications that rely upon those servers. Because of the importance of servers and server systems, a need exists for better methods of updating computer systems.

SUMMARY

A method and apparatus are provided for collecting deployment information from a user for a multi-tier computer system. The method includes the steps of receiving a deployment size of the multi-tier system from the user and identifying a set of virtual appliances by function based upon the deployment size received from the user. The method further includes the steps of prompting the user for a name for each identified virtual appliance, collecting network information of each virtual appliance based upon the name and generating a deployment configuration file for a mandatory virtual appliance of the set of virtual appliances.

DETAILED DESCRIPTION OF AN ILLUSTRATED EMBODIMENT

Figure 1:
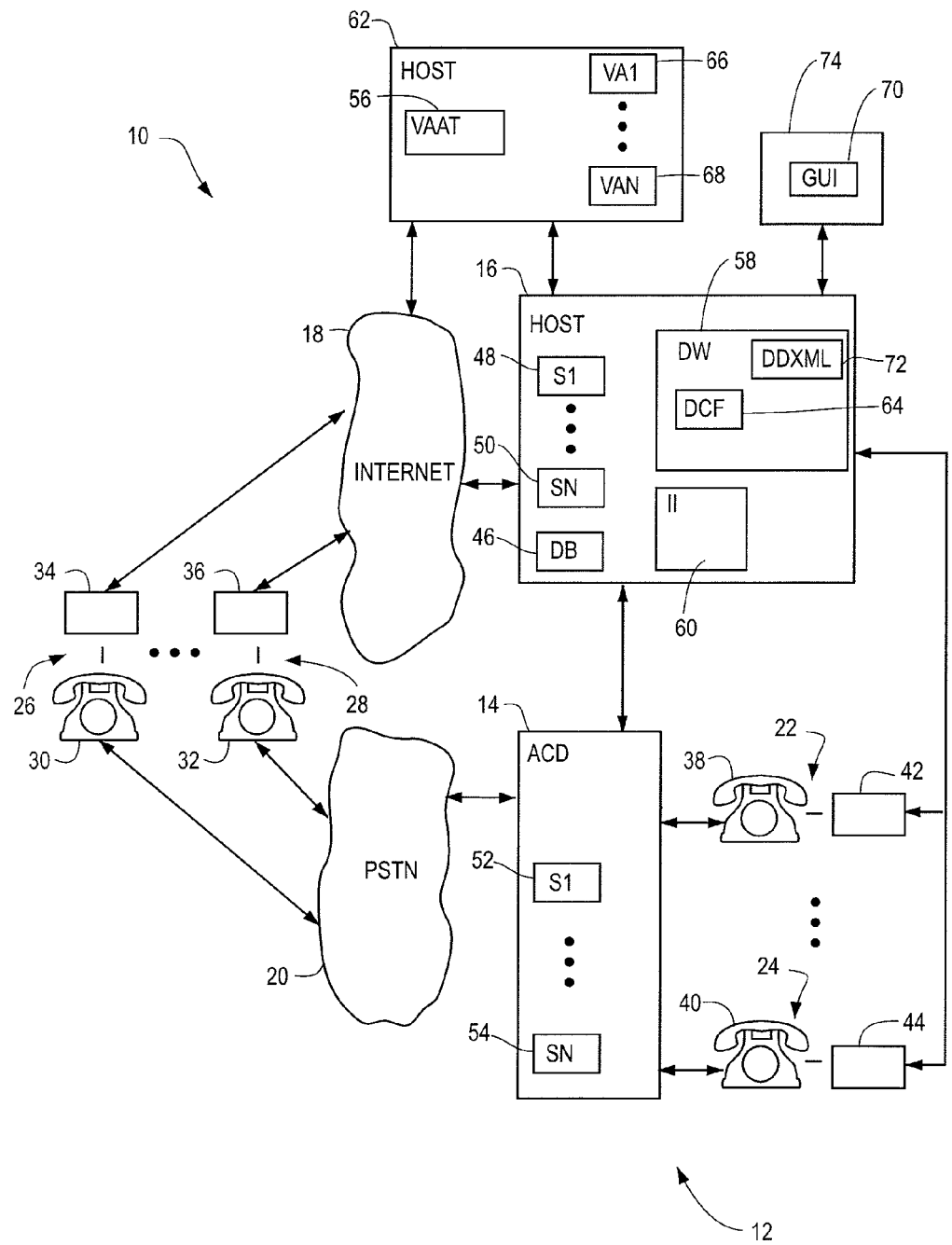
FIG. 1 depicts a computer system for collecting deployment information for a multi-tier computer system in accordance with an illustrated embodiment of the invention.

FIG. 1 is a block diagram of a software installation system 10 for automatically installing software onto a computer system shown generally in accordance with an illustrated embodiment of the invention. The software system 10 may be used in a broad range of computing applications and environments. While the system 10 may have application to many different computer system, the software loading system 10 may be of particular value in the case of a computer system with many servers such as a automatic call distribution system 12, such as that shown in FIG. 1.

When multi-tier software systems must be updated, software suppliers will often build a software tool referred to as a software or application installer. An application installer is a custom application that is loaded into a computer and that installs software products on top of preexisting software machines that had previously been set up by IT personnel responsible for the computer system.

A variation of an application installer is a software or virtual appliance. A virtual appliance differs from an application installer in that it is provided with its own operating system environment. A virtual appliance, as with the application installer, is self-contained in the sense that it is oblivious to the environment in which it is installed.

In the past, the use of pre-built software installers or virtual appliances has often produced unpredictable results since it was often likely that the software product to be installed had not been fully tested in the intended environment. For example, the end user may have very different IT security, network and machine setup standards than that of the software developer. Products successfully tested by the software developer often do not work as expected once deployed into the customer's environment due to different pre-existing conditions (e.g., security policies, network settings, additional software, etc.).

In addition, many pre-built software installers or virtual appliances often require the input of information for each and every machine on which the software is to be installed. The requirement for additional information often causes input errors and can lead to mis-configured deployments where consistent information is not provided.

To address these problems, the system 10 provides an interface that collects information about the specific environment of deployment. Processing features within the system 10 process the collected information to produce an interface profile that allows a software system with a number of servers to be properly configured and deployed with a minimum of or no user interaction.

The system 10 will be described in the context of use with an automatic call distribution system 12. While use within an automatic call distributor may simplify installation of upgrades and modifications, it should be understood that the system 10 can also be used in virtually any other multi-tier computer system. As used herein, a multi-tier computer system is a computer system with a multitude of inter-dependent servers.

In general, the automatic call distribution system 12 of FIG. 1 may be used by an organization to route calls between clients 26, 28 and agents 22, 24 of the organization. In this regard, a customer 26, 28 may place a call to the organization using a respective telephone 30, 32 of the client 26, 28. The call may be routed through the public switch telephone network (20) to an automatic call distributor (ACD) 14 of the organization.

The ACD 14 may detect the call and determine the identity of the caller and/or purpose of the call using any of a number of PSTN features (e.g., ANI, DNIS, etc.). Upon identifying the caller and/or purpose of the call, the system 12 may select an agent 22, 24 best suited to handle the call and route the call to a respective telephone 38, 40 of the selected agent 22, 24. As the call is delivered to the selected agent, a host 16 of the call distribution system 12 may use the determined identity of the client 26, 28 to deliver client records to a respective terminal 42, 44 of the selected agent 22, 24 at the same instant that the call arrives.

Alternatively, the client 26, 28 may send an e-mail to the organization using a personal computer 34, 36 of the client 26, 28. The e-mail may be routed through the Internet 18 to a host 16 of the organization. The host 16 may identify the client 26, 28 via a source URL and/or a purpose of the call from the "Re:" line of the e-mail and route the call accordingly.

In each case, the agent 22, 24 may converse with the client 26, 28 retrieve information from a database 46 and/or enter into transactions with the client 26, 28. In each case, a record of the transaction may be created and saved in the database 46.

In order to provide the functionality required, the call distribution system 12 may require a number of servers 48, 50, 52, 54. A first server (e.g., 48) may be a routing server that selects agents for handling calls. A second server (e.g., 50) may be a web hosting server. Another server (e.g., 52) may be a operational database server. Still other servers (e.g., 54) may be a reporting database server, a recording database server, or agent portal servers.

Turning now to the system 10, an explanation will be provided as to how the software system 10 may be used in its numerous embodiments. The software system 10 includes at least three components. The three components may include a virtual appliance automation tool (VAAT) 56, a deployment wizard (DW) 58 and an image installer (II) 60.

In general, the software installation system 10 is provided by a software developer for use by the organization in automatically installing software within the system 12. The virtual appliance automation tool 56 may reside on a host 62 operated by the software developer while the deployment wizard 58 and image installer 60 may exist in the form of CDs or files transferred between the host 62 of the software developer and host 16 of the organization.

The deployment wizard 58 is an automated tool that may be used to collect information about the interrelation and environment of the servers 48, 50, 52, 54. Information about the servers 48, 50, 52, 54 is collected into a deployment configuration file 64 configured under the appropriate format (e.g., xml).

As used herein, a deployment configuration file 64 is a portable data structure that contains, inter alia, a comprehensive set of interface protocols for at least some servers of a multi-tier computer system. In this case, a set of interface protocols define who and how a server interacts with the other servers, not just for any system, but for the specific multi-tier system in which the server will operate. More specifically, the interface protocols are collected from the multi-tier system in which the servers will be installed.

Each of the sets of interface protocols is incorporated into a respective virtual appliance for the installation of the server into the multi-tier system. By incorporating the interface protocols into the respective virtual appliances, the servers can be individually installed by the respective virtual appliance, automatically, without regard to local security, network settings and machine setup standards.

The deployment configuration file 64 is accessed by the virtual appliance automation tool 56 either directly (e.g., through a CD) or through the Internet 18 in the case where the configuration file 64 resides on the host 16. The information within the deployment configuration file 64 may be used by the virtual appliance automation tool 56 to create one or more virtual appliances (VAs) 66, 68 that may have the same or similar functionality of a respective server 48, 50, 52, 54 that the virtual appliance 66, 68 will replace. Once created, the virtual appliances 66, 68 and deployment configuration file 64 may be loaded onto a CD that is transported to and placed into a media drive of the system 12. Once loaded, the virtual appliances 66, 68 are used by the image installer 60 to automatically install and activate the appliances 66, 68 on the system 12.

The deployment wizard 58 is a software application (i.e., program) that may operate in conjunction with a deployment description XML file (DDXML) 72 of a predetermined product line (e.g., automatic call distribution systems) to collect information for software revisions, updates or replacements. Relying upon information within the DDXML, the deployment wizard 58 may prompt a user for information about the system 12. As the user provides answers to each question, the deployment wizard 58 uses the answers in conjunction with information from the DDXML to formulate further questions directed to determining the specific configuration of the system 12. In this manner, the deployment wizard 58 is able to construct a deployment configuration file 64 that precisely describes the system 12.

The deployment wizard 58 may also pose questions and collect answers based upon the structure of the system 12 and the intent of the software deployment. For example, the deployment wizard 58 may first determine a deployment type to identify any changes. In general, the deployment type relates to functionality and size of the system 12. It should be noted in this regard that the deployment may be an update of existing software, an expansion of the existing software or the deployment may include the addition of specific features necessary to address performance issues.

For example, any multi-tier system involving a number of interactive systems would include a naming convention that allows the servers to interact. The naming convention in the highest level case would include a unique system name for each server that allows the server to interact with the other servers. The naming convention may include a simple high-level system name and/or a pathname that allows one server to communicate with another server either directly or through one or more intermediate servers.

The deployment wizard 58 uses its own knowledge (provided through the DDXML 72) of system size and various configurations to allow a user to select user names and system options. With the prior knowledge, the deployment wizard 58 is able to propagate a naming convention and system option selections (e.g., security level and privilege options) through a deployed system without the need for duplicate entries of names or selection options.

As a first step, the deployment wizard 58 may collect information with regard to the number of mandatory servers within the system 12. In this case, the number of mandatory servers is dependent upon the deployment type.

As an additional step, the deployment wizard 58 may also determine the number of additional servers required, if any. These are servers that can be added to a deployment to gain increased volume.

As an additional step, the deployment wizard 58 may also determine the number of optional servers required. Optional servers can be added to a deployment to gain additional functionality and/or volume.

As a further additional step, the deployment wizard 58 may also collect site, logon and authentication information. The deployment wizard 58 may also collect database sizing information, virtual machine information and tenant and tenant server information. Inherent in the use of the deployment wizard 58 is the fact that some parts of the system 12 would remain in an original state and would not be replaced or upgraded. As such, the deployment wizard 58 must determine the characteristics and features of the interfaces of these unmodified resources of the system 12 in order to ensure the proper operation of the modified system 12.

The deployment wizard 58 may be controlled through use of a graphical user interface (GUI) 70 that may be displayed on a terminal 74 of a supervisor or designated IT personnel. The deployment wizard 58 may display a set of dialog screens (FIGS. 2-60) on the terminal 74 and receive information through the dialog screens from the supervisor or other IT personnel in order to gather information regarding the deployment.

The deployment wizard 58 may have and use at least one of three sets of dialog screens based upon the type and size of the system 12 involved. A first set of dialogs may be for single tenant deployments, where a single tenant involves a single integrated computer system.

Another set of dialogs may be for a multi-tenant deployment occupying more than one site. For multi-tenant deployments, a default tenant is provided and the default tenant is used to create additional tenants as needed.

The third set of dialogs is for custom deployments (e.g., for updates, addition of certain product features, etc.). For custom deployments, a default tenant is provided and a user is, again, allowed to customize the default tenant or create additional tenants as needed.

Figure 2:
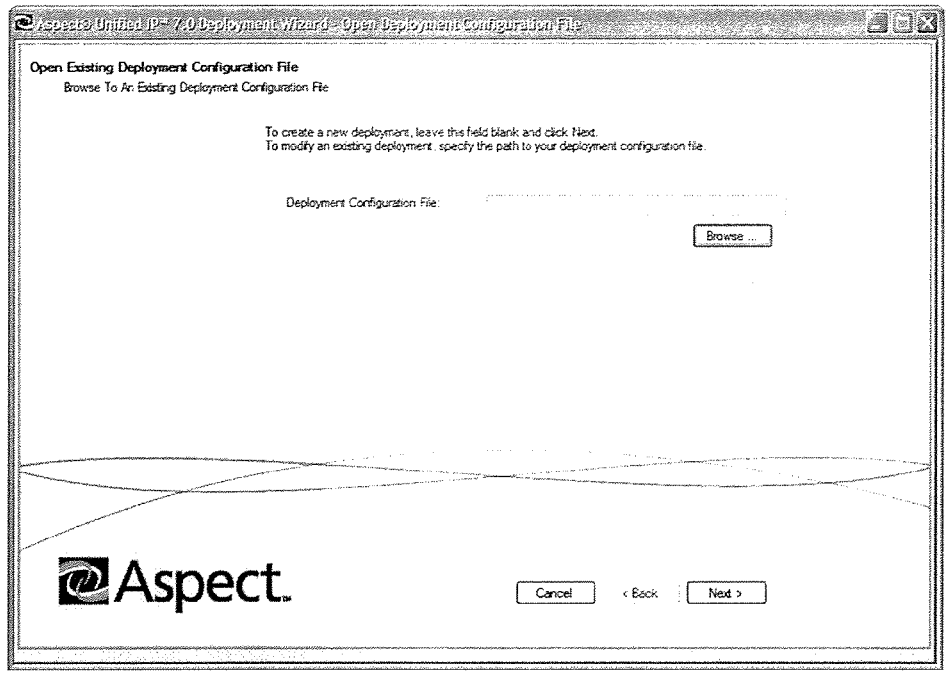
FIG. 2 depicts an interactive window displayed on a screen of a computer for identifying a configuration file used by the system of FIG. 1.

Following is a description of the dialogs and first set of screens (FIGS. 2-24) provided to a user by the deployment wizard 58 in a first example for single tenant deployments. In this regard, FIG. 2 depicts a configuration file selection screen generated by a configuration file program module of the deployment wizard 58. The first screen provides a mechanism for a user to select or open a configuration file 64.

The user may open a new configuration file 64 by entering a file identifier (pathname) and activating the NEXT softkey at the bottom of the first screen. Alternatively, the user may open and modify an existing file 64 by activating a BROWSE softkey and selecting a preexisting file from a list. This may be useful where the user may begin setting up a software system and may wish to go back and make changes. In either case, the user creates or identifies a configuration file and the deployment wizard 58 operates to save any subsequent entries or changes made by the user into the file 64 identified by the user.

Figure 3:
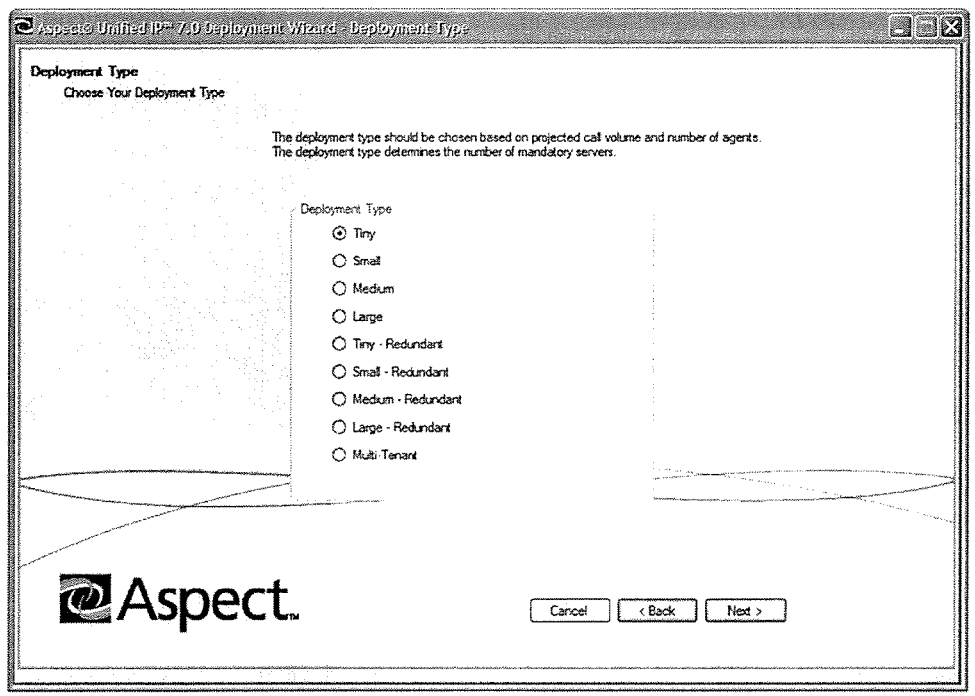
FIG. 3 depicts an interactive window for identifying a deployment type used by the system of FIG. 1.

After identifying the deployment file 64 and activating the NEXT softkey in FIG. 2, a deployment size program module within the deployment wizard 58 may present a deployment type screen such as that shown on FIG. 3 to the user. The deployment type screen presents the user with a number of prompts of different deployment types that may be chosen by the user. In each case, the deployment type may be chosen based upon system functionality, system size and the projected call volume and number of agents. The selected deployment type is used by the deployment wizard, for example by reference to the DDXML 72, to determine the number of mandatory servers that will be required for the deployment.

The user may select a deployment type and activate the NEXT softkey or activate the CANCEL softkey to terminate the process. The user may also activate the BACK softkey to return to the configuration file selection screen.

Figure 4:
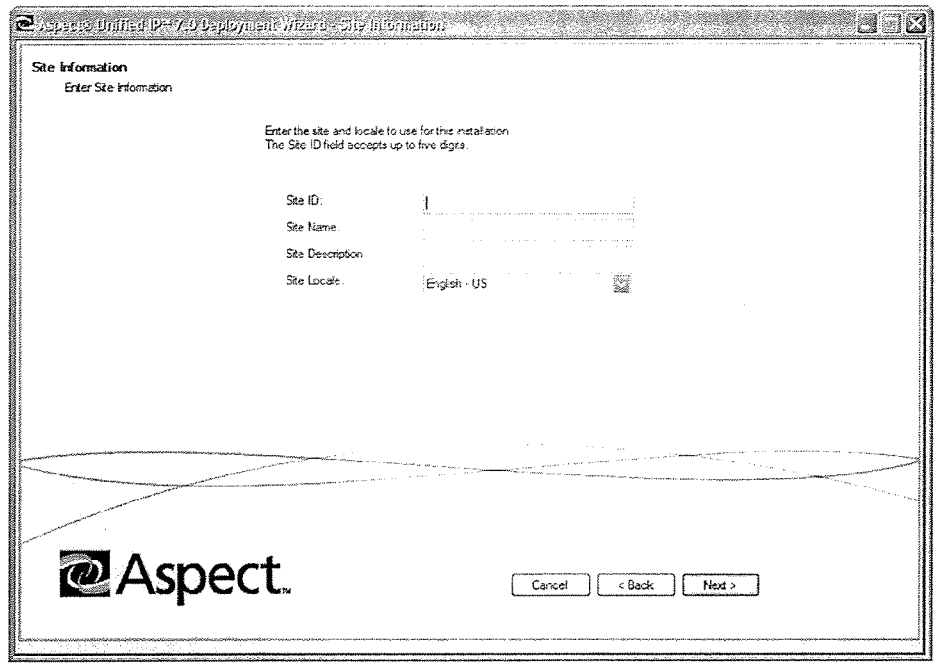
FIG. 4 depicts an interactive window for collecting site information used by the system of FIG. 1.

Following selection of a deployment type (e.g., Tiny, Small, Medium, Large, Tiny-Redundant, Small-Redundant, Medium-Redundant or Large-Redundant) and activation of the NEXT softkey on the deployment type screen of FIG. 3 the deployment type is saved to the configuration file and a site identification program module of the deployment wizard is activated. In response, the user is presented with a site information screen such as that shown in FIG. 4. FIG. 4 prompts the user for information about where the software deployment will occur. The site information may include a Site ID, a Site Name, a Site Description and a Site Locale. The Site ID may be an ID provided by the software developer or may be an IP address. The Site Name may also be a name provided by the user or developer (e.g., a customer identifier). The Site Description may be a functional description of the site. The Site Locale may be a language indicator.

Figure 5:
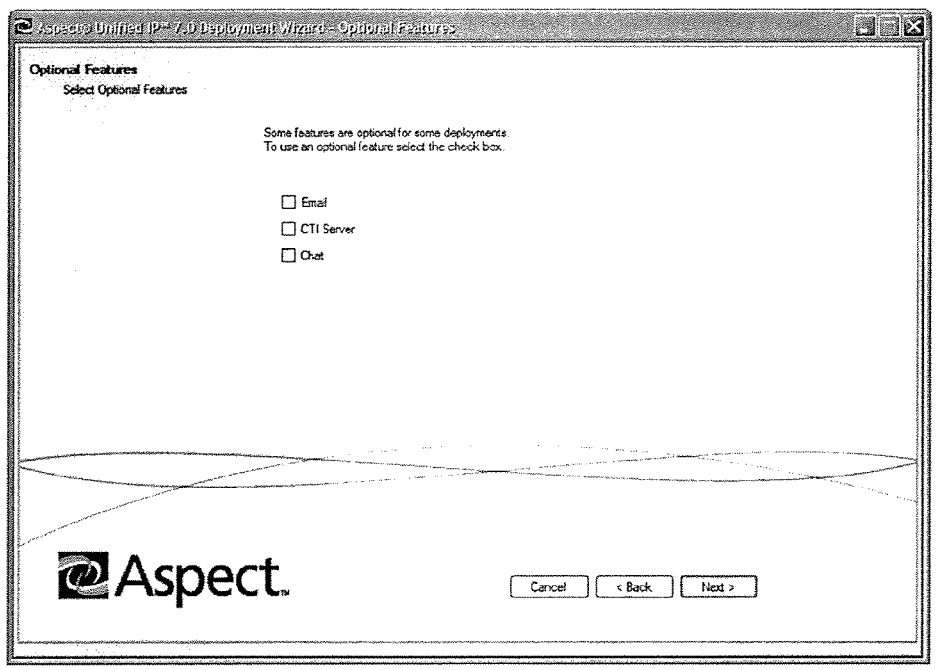
FIG. 5 depicts an interactive window for collecting information about optional features used by the system of FIG. 1.

Following the entry of information about the site and activation of the NEXT softkey on the site information screen of FIG. 4, the site identification program module saves the entered information in the configuration file and may activate an optional features program module. The optional features program module may prompt the user for optional features via the select optional features screen of FIG. 5. As shown in FIG. 5, the optional features may include an identifier of e-mail server, a computer-telephony integration (CTI) server and/or a chat server. The user may select one or more of the respective e-mail server, CTI server and chat server by activating an interactive check box beside the respective labels.

Following entry of optional features and activation of the NEXT softkey on the select optional features screen, the site identification module may save the optional features in the deployment file and the deployment wizard 58 may open a series of network information program modules for collecting network information. The collected network information gives the virtual appliance automation tool 56 and image installer 60 the rights and privileges necessary to push programs and updates to the system 12 without the direct involvement of a human installer. The first network information program module may be a database administration services program module controlled via a network information screen such as that shown FIG. 6. The second network information program module may be a scheduled reporting services program module controlled via a reporting services screen such as that shown in FIG. 7 and the third network information program module may be an import export program module controlled via an import/export screen such as that shown FIG. 8. As the user completes entry of login information on each screen, the user activates a NEXT softkey to move to the next screen.

Figure 6:
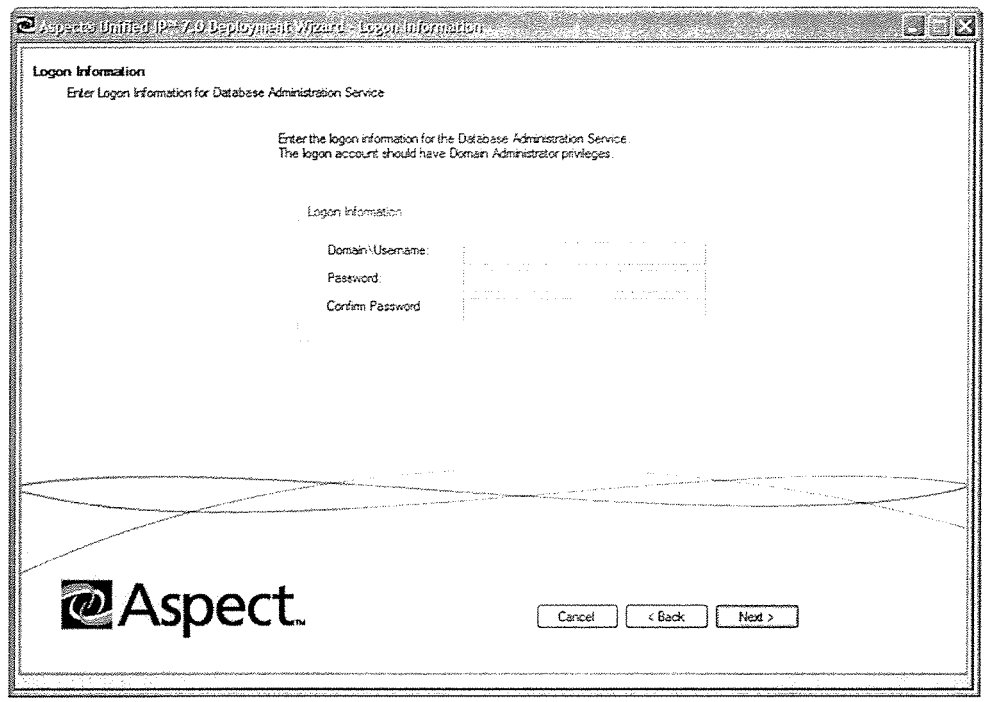
FIG. 6 depicts an interactive for collecting logon information for data administration services used by the system of FIG. 1.

The database login screen of FIG. 6 allows the user to enter a Domain/Username into a first interactive window of a set of interactive windows. Following entry of the Domain/Username through a first interactive window, the user enters his/her password in a second interactive window and confirms his/her password in a third interactive window of FIG. 6. The deployment wizard saves this information along with the previously collected information in the configuration file 64. As suggested above, the Domain Usernames and passwords allow the image installer 60 to automatically install database servers and other database applications automatically without further significant input from the user.

Figure 7:
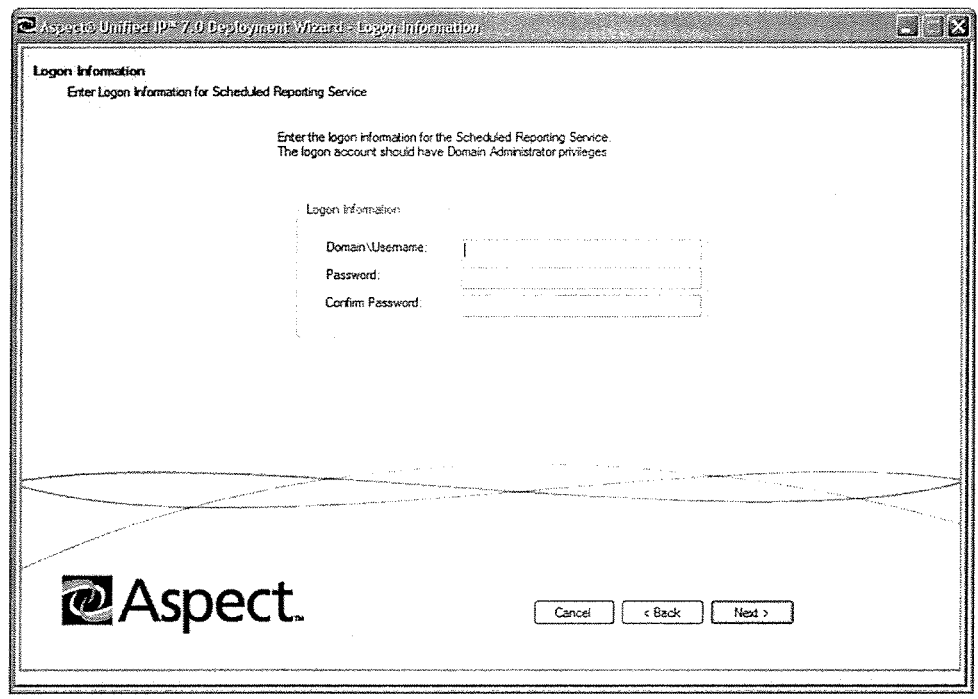
FIG. 7 depicts an interactive window for collecting scheduled reporting services information used by the system of FIG. 1.

Following entry of login information for the Database Administration Service, the user is prompted in FIG. 7 for reporting services login information for Scheduled Reporting Services. As before, the user enters the Domain Username in a first interactive window, a password in a second interactive window and a confirmation of the password in a third interactive window of FIG. 7. The deployment wizard saves this information along with the previously collected information in the deployment file 64. The Domain/Username and password allow the image installer 60 to automatically install reporting servers and other applications automatically without further significant input from the user.

Figure 8:
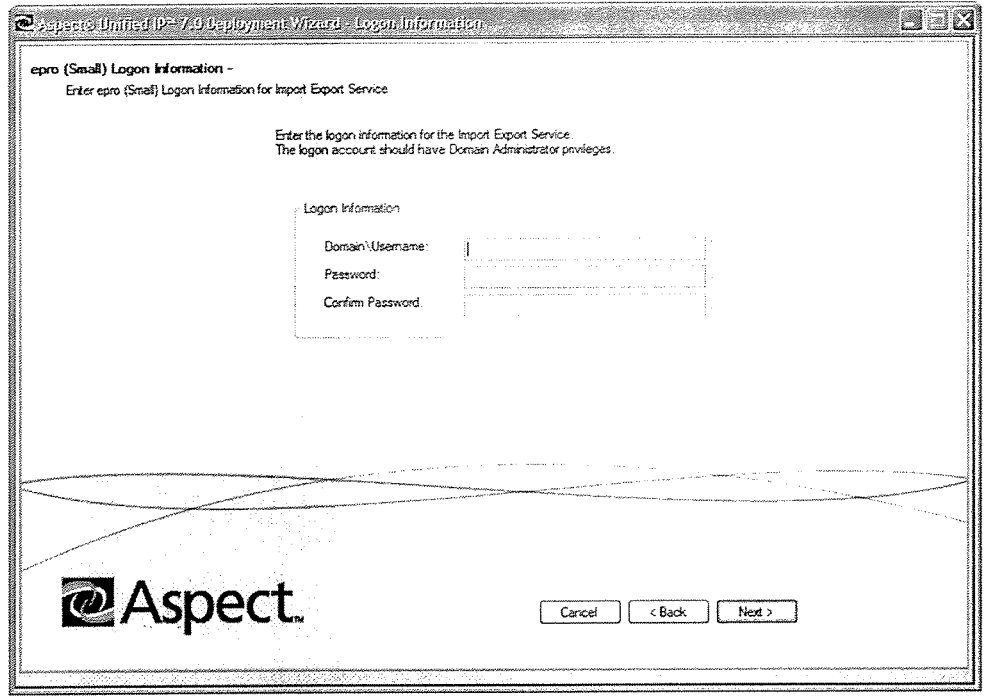
FIG. 8 depicts an interactive window for collecting import export services information used by the system of FIG. 1.

Similarly the user provides import/export login information for Import/Export Services using the screen of FIG. 8. As before, the user enters the Domain/Username in a first interactive window, a password in a second interactive window and a confirmation of his password in a third interactive window of FIG. 8. The deployment wizard saves this information along with the previously collected information in the deployment file 64. The Domain/Username and password allow the image installer 60 to automatically import and export deployment information through an import/export device (e.g., DVD, Internet, etc.) automatically without further significant input from the user.

Figure 9:
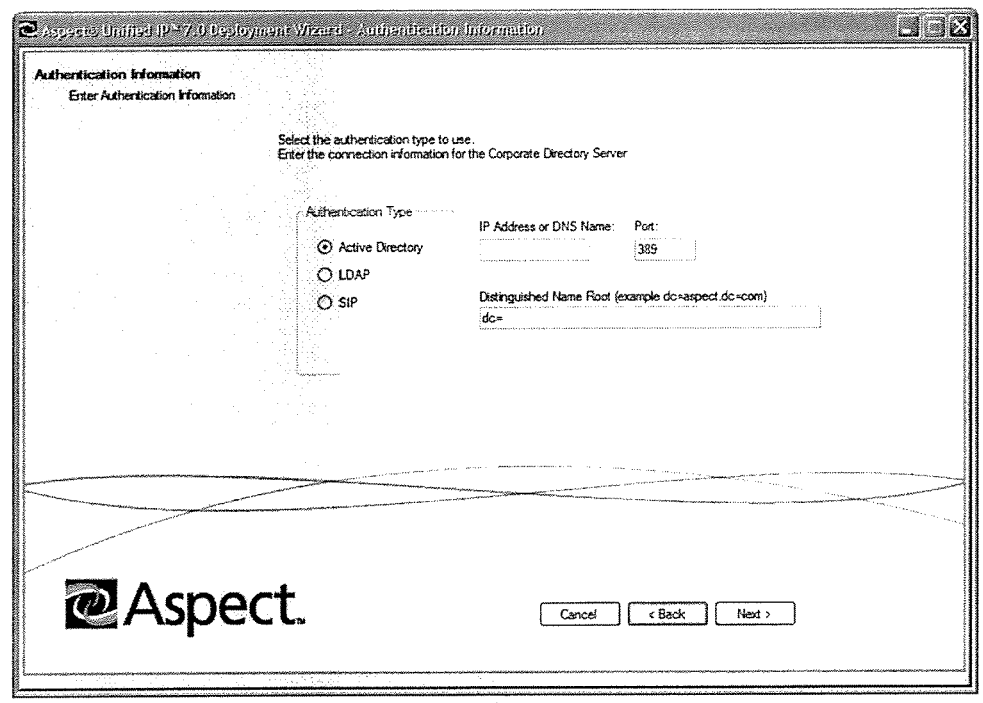
FIG. 9 depicts an interactive window for collecting authentication information used by the system of FIG. 1.

Following entry of login information, the user is prompted via the login authentication screen of FIG. 9 for a source of authentication information for logins (e.g., the corporate directory server). If the user checks a first, second or third interactive window labeled "Active Directory", "LDAP" or "SIP", then the user will be prompted to enter an IP address or DNS name of the Active Directory, LDAP or SIP directory in a fourth interactive window labeled "IP Address or DNS Name." The port number will be assumed to be "389" unless the user changes the port number in the fifth interactive window labeled "Port." In the case of selection of the Active Directory or LDAP directory, the user will also be prompted to enter a name of the root directory in a sixth interactive window labeled "Distinguish Name Root (example dc=aspect, dc=com)."

Following entry of login information and login directory information, the user activates the NEXT softkey and the bottom of the screen of FIG. 9 and the deployment wizard stores the login information in the configuration file.

The deployment wizard 58 may verify the accuracy of entered network information at each instance of entry via a system query. If the system 12 returns an error, then the user may be prompted to re-enter the correct information. Alternatively, the deployment wizard 58 may simply save the received network information into the configuration file 64.

Following receipt of network information, the deployment wizard may activate a mandatory servers program module and the user may, in turn, may be prompted for information on mandatory servers. Within the example of the automatic call distributor 12, the number of mandatory servers is determined by the deployment type selected through the deployment type screen of FIG. 2 by reference to the DDXML 72.

Figure 10:
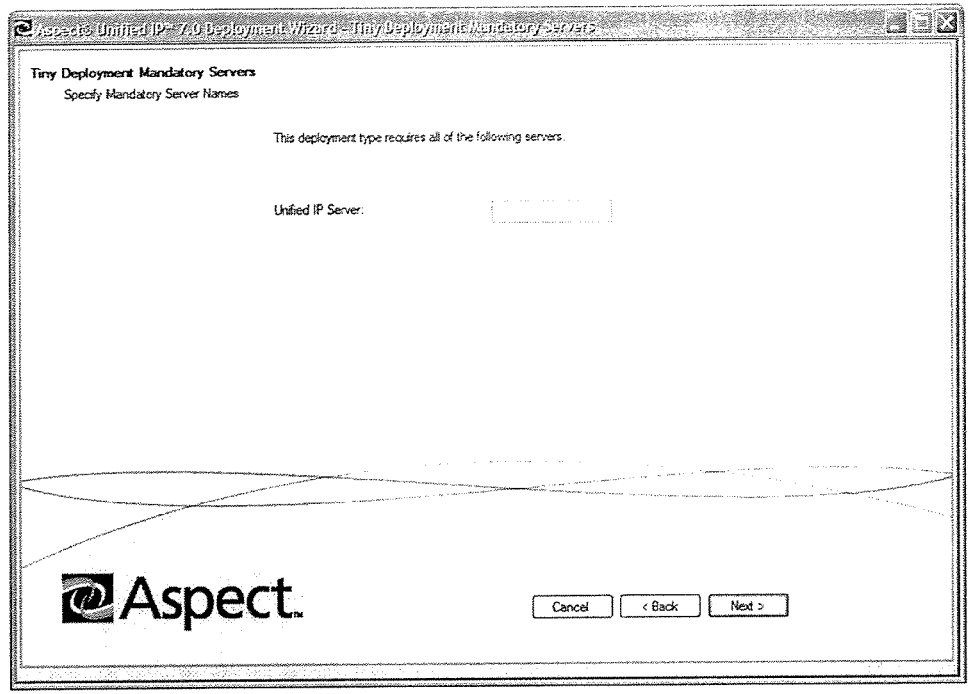
FIG. 10 depicts an interactive window for collecting deployment information for a tiny site used by the system of FIG. 1.

For example, if the user had checked the interactive box at the top of the deployment type screen of FIG. 3 labeled "Tiny", then after activating the NEXT softkey on FIG. 3, the deployment wizard 58 may by reference to the DDXML 72 determine that only a single unified server would be required and take the user to a Tiny Deployment Mandatory Servers screen such as that shown on FIG. 10. In this case, the user is prompted for a unique system identifier (name) of the unified server through an interactive window on FIG. 10.

In response, the user may enter a system name for the unified server. In response, the deployment wizard 58 may verify that the entered name. Verification means that the name is not an IP address and is unique across the deployment.

Figure 11:
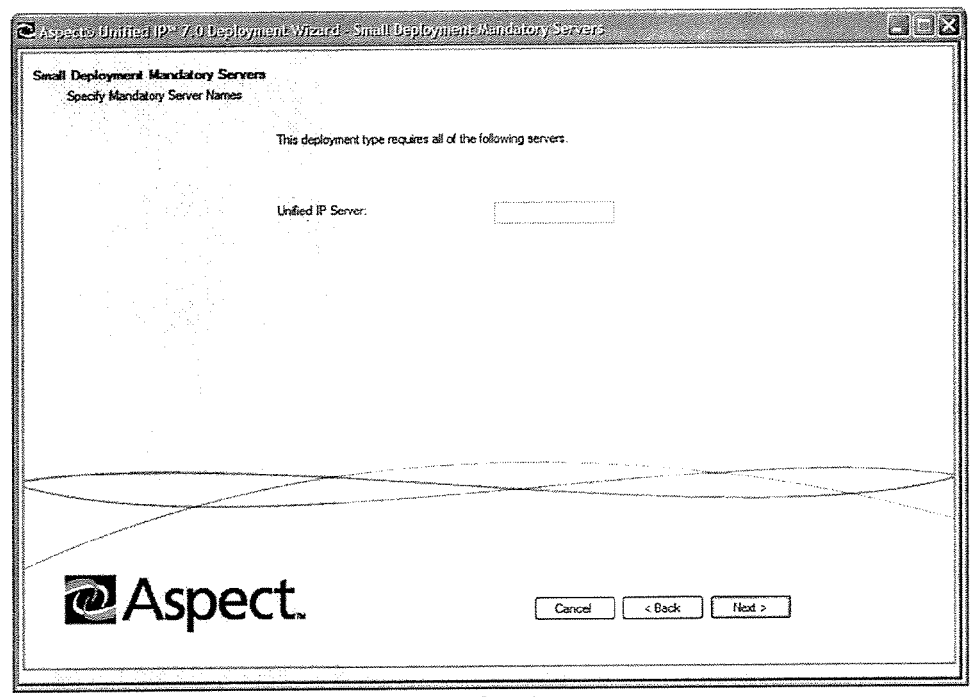
FIG. 11 depicts an interactive window for collecting deployment information for a small site used by the system of FIG. 1.
Figure 12:
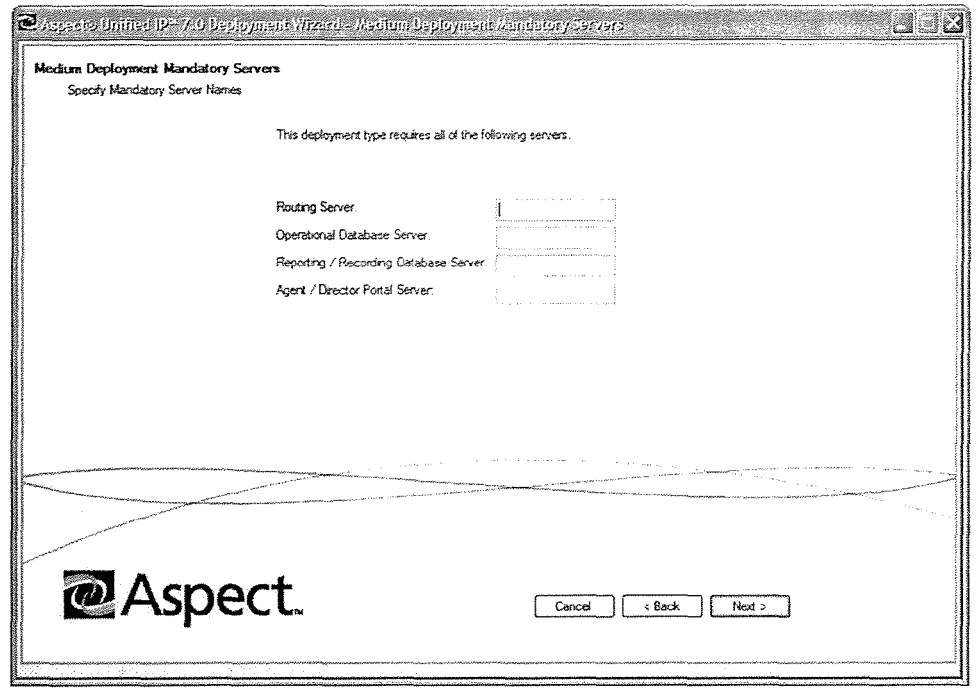
FIG. 12 depicts an interactive window for collecting deployment information for a medium site used by the system of FIG. 1.

Alternatively, if the user had checked the interactive box labeled Small at the top of the deployment type screen of FIG. 3, then after activating the NEXT softkey on FIG. 3, the deployment wizard 58 may, by reference to the DDXML determine that a single unified server is necessary and take the user to the Small Deployment Mandatory Servers screen of FIG. 11. In this case, the user is again prompted for a name of the unified server through an interactive window on FIG. 11. Upon entering the name and activating the NEXT softkey, the name is verified and saved in the configuration file.

As another alternative, if the user had checked the interactive box at the top of the deployment type screen of FIG. 3 labeled Medium, then after activating the NEXT softkey on FIG. 3, the deployment wizard 58 may determine by reference to the DDXML that additional servers are required. In this case, the deployment wizard may take the user to a Medium Deployment Mandatory Servers screen such as that shown on FIG. 12. In this case, a medium sized automatic call distributor 12 may be serviced by at least four servers and the user is prompted for a name of each of the servers (e.g., a routing server, an operational database server, a reporting/recording database server, an agent director portal server, etc.) through the interactive windows on FIG. 12. Upon entering the names and activating the NEXT softkey, the names are verified and saved in the configuration file.

Figure 13:
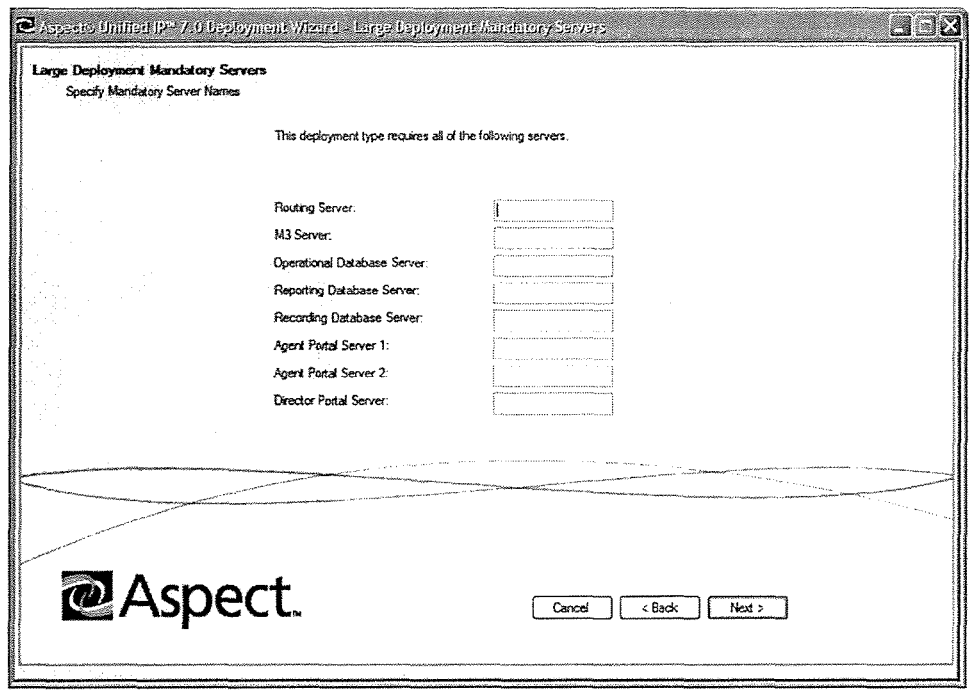
FIG. 13 depicts an interactive window for collecting deployment information for a large site used by the system of FIG. 1.

As still another alternative, if the user had checked the interactive box at the top of the deployment type screen of FIG. 3 labeled "Large", then after activating the NEXT softkey on FIG. 3, the deployment wizard 58 may take the user to a Large Deployment Mandatory Servers screen such as that shown on FIG. 13. In this case, the deployment wizard may determine that a large sized automatic call distributor 12 may be serviced by up to eight servers and the user is prompted for a name of each of the servers. The servers may include such servers as: 1) a routing server, 2) a M3 server, 3) an operational database server, 4) a reporting database server, 5) a recording database server, 6) an agent portal server 1, 7) an agent portal server 2 and 8) a director portal server. In each case, the user enters a name of each server into a corresponding interactive window. Upon entering the name and activating the NEXT softkey, the names are verified and saved in the configuration file 64.

Figure 14:
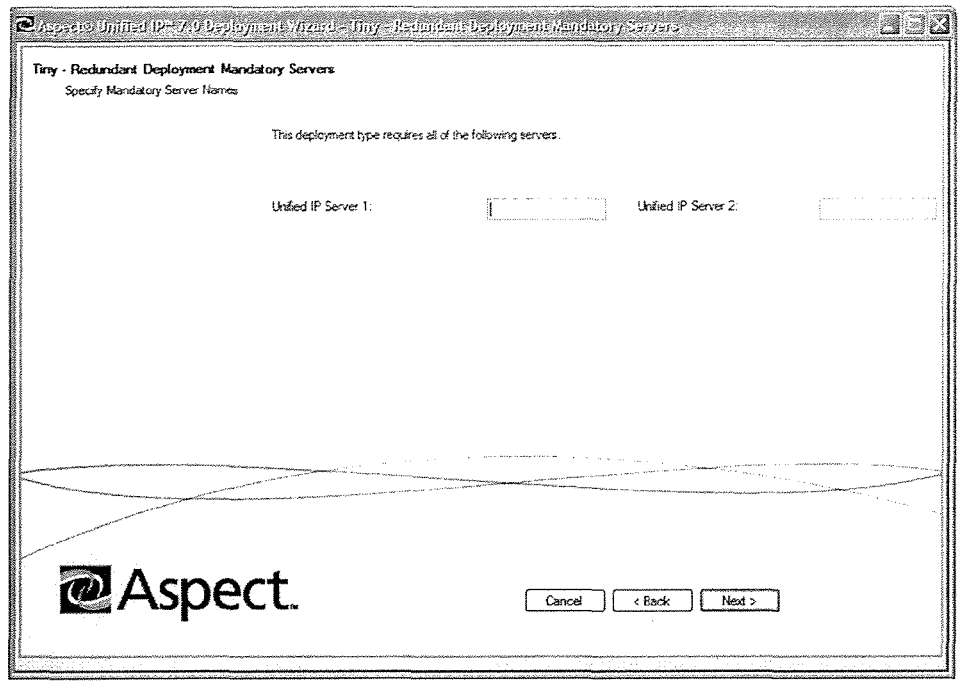
FIG. 14 depicts an interactive window for collecting deployment information for a tiny redundant site used by the system of FIG. 1.

If the user had checked the interactive box at the top of the deployment type screen of FIG. 3 labeled "Tiny-Redundant", then after activating the NEXT softkey on FIG. 3, the deployment wizard 58 may by reference to the DDXML 72, determine that only two unified servers would be required and take the user to a Tiny-Redundant Deployment Mandatory Servers screen such as that shown on FIG. 14. In this case, the user is prompted for a name for each of the unified server through an interactive window on FIG. 14. Upon entering the name and activating the NEXT softkey, the names are verified and saved in the configuration file 64.

Figure 15:
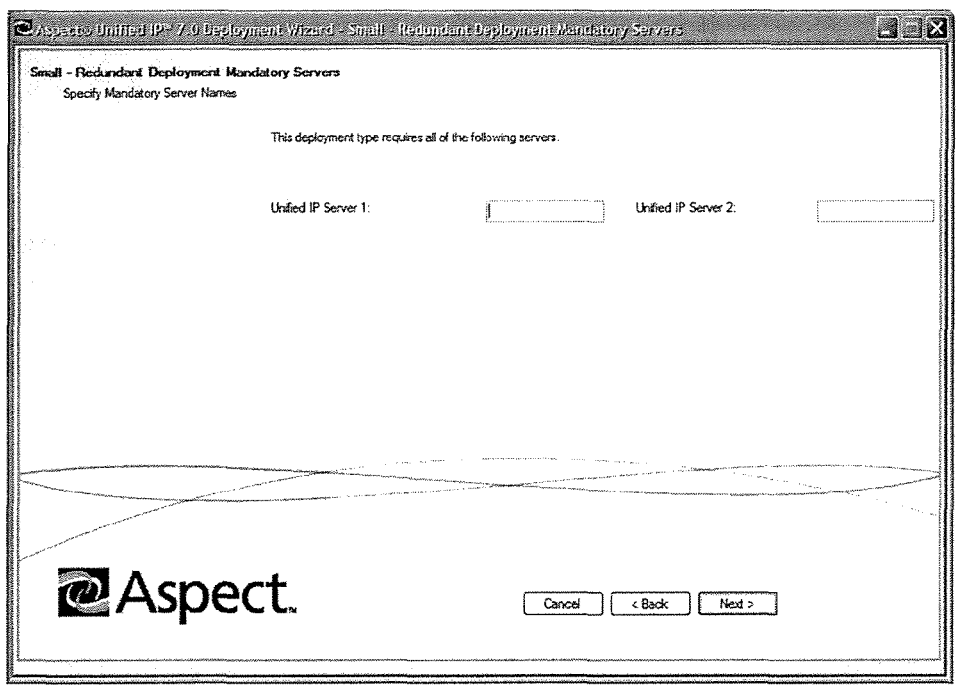
FIG. 15 depicts an interactive window for collecting deployment information for a small redundant site used by the system of FIG. 1.
Figure 16:
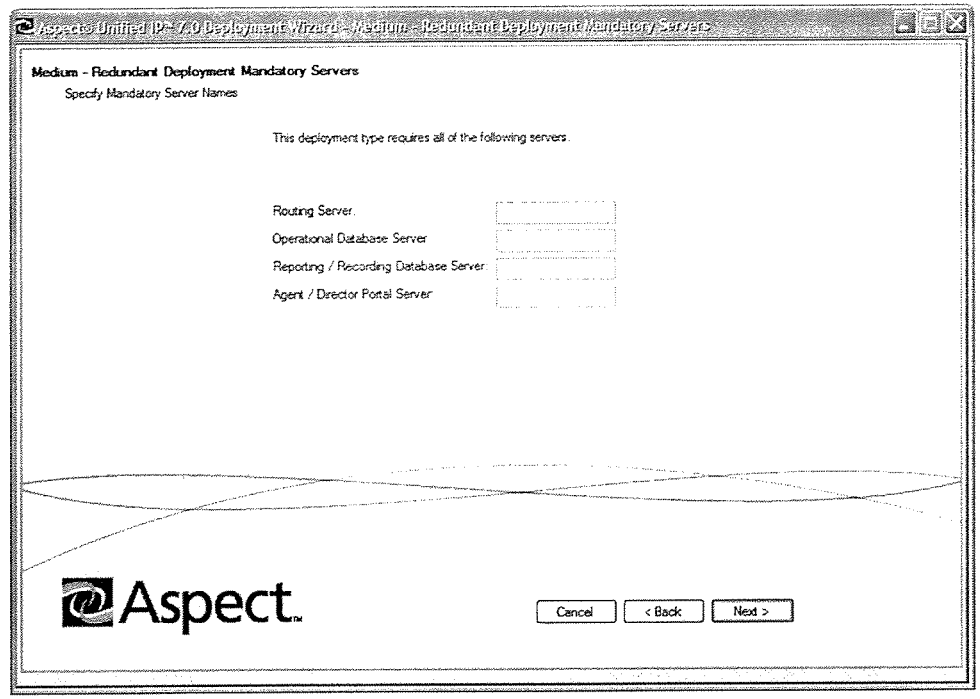
FIG. 16 depicts an interactive window for collecting deployment information for a medium redundant site used by the system of FIG. 1.

If the user had checked the interactive box at the top of the deployment type screen of FIG. 3 labeled "Small-Redundant", then after activating the NEXT softkey on FIG. 3, the deployment wizard 58 may, by reference to the DDXML, determine that two unified servers are necessary and take the user to a Small-Redundant Deployment Mandatory Servers screen such as that shown on FIG. 15. In this case, the user is again prompted for a name for each of the unified servers through an interactive window on FIG. 15. Upon entering the name and activating the NEXT softkey, the names are verified and saved in the configuration file.

If the user had checked the interactive box at the top of the deployment type screen of FIG. 3 labeled "Medium-Redundant", then after activating the NEXT softkey on FIG. 3, the deployment wizard 58 may determine by reference to the DDXML that additional servers are required. In this case, the deployment wizard may take the user to a Medium-Redundant Deployment Mandatory Servers screen such as that shown on FIG. 16. In this case, a medium sized automatic call distributor 12 may be serviced by duplicates at least four servers. In this case the user is prompted for a name of each of the first four servers (e.g., a routing server, an operational database server, a reporting/recording database server, an agent/director portal server, etc.) through the interactive windows on FIG. 16. Upon entering the names and activating the NEXT softkey, the names are saved in the configuration file and a second screen substantially the same as the first screen may be presented for entry of the names of a set of redundant servers which are entered, subsequently verified and saved to the configuration file.

Alternatively, the names of the redundant servers may be generated automatically using some nomenclature where the redundant server has some alphanumeric extension (e.g., "-R"). In this case, only the names of the primary servers need be stored to the configuration file along with the indication that a redundant set of servers are also needed.

Figure 17:
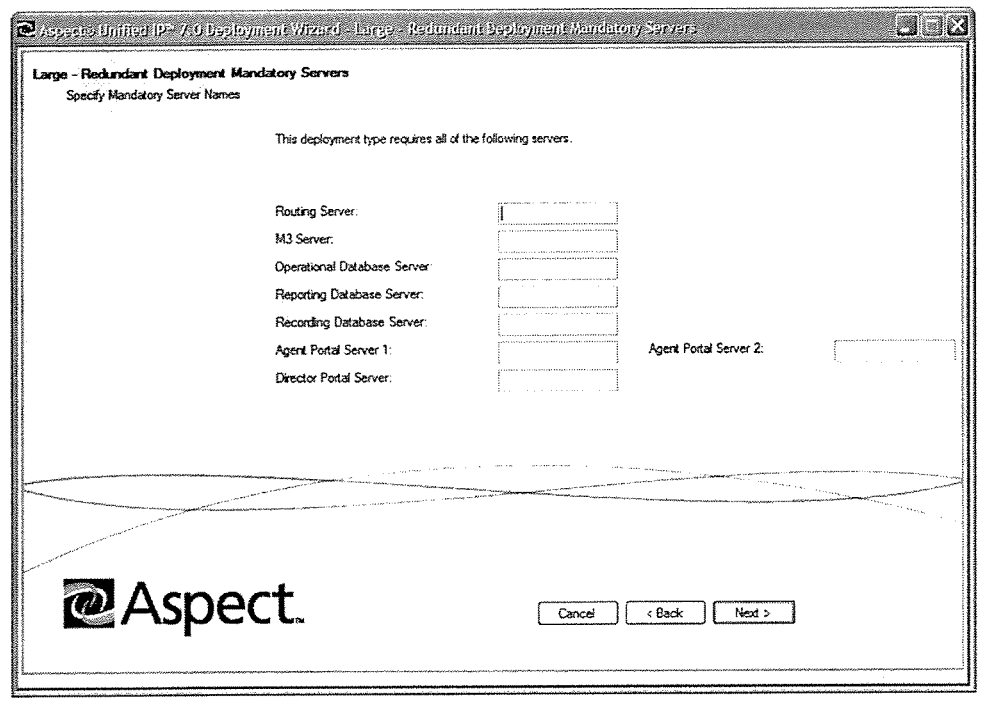
FIG. 17 depicts an interactive window for collecting deployment information for a large redundant site used by the system of FIG. 1.

If the user had checked the interactive box at the top of the deployment type screen of FIG. 3 labeled "Large-Redundant", then after activating the NEXT softkey on FIG. 3, the deployment wizard 58 may take the user to a Large-Redundant Deployment Mandatory Servers screen such as that shown on FIG. 17. In this case, the deployment wizard may determine that a large-redundant automatic call distributor 12 may be serviced by up to eight servers and the user is prompted for a name of each of the primary servers. The servers may include such servers as: 1) a routing server, 2) a M3 server, 3) an operational database server, 4) a reporting database server, 5) a recording database server, 6) an agent portal server 1, 7) an agent portal server 2 and 8) a director portal server. In each case, the user enters a name of each server into a corresponding interactive window. Upon entering the name and activating the NEXT softkey, the names are saved in the configuration file and a duplicate screen of FIG. 17 may be presented for redundant names or the redundant names are generated automatically.

Figure 18:
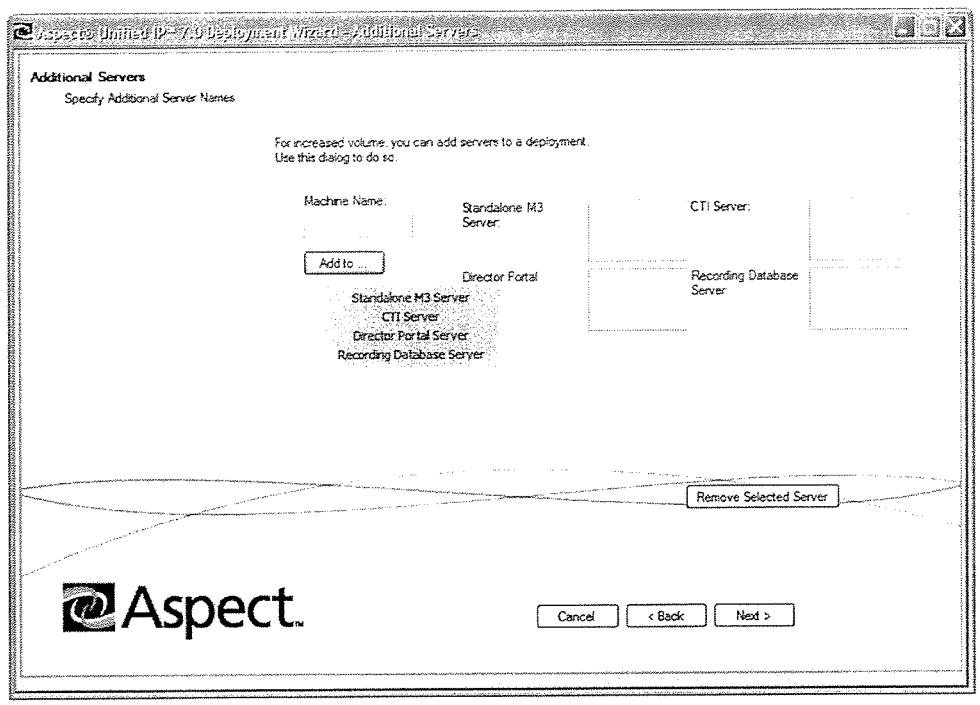
FIG. 18 depicts an interactive window for collecting information about addition servers used by the system of FIG. 1.

Following activation of the NEXT softkey in the interactive windows of FIGS. 10, 11, 12, 13, 14, 15, 16, 17, an additional servers software module within the deployment wizard may present the additional servers screen similar to FIG. 18 to the user. If the user has a need for additional servers, then the user may enter a name within an interactive window labeled Machine Name of a machine to which the one or more optional servers are to be added. In the case of multiple servers (e.g., Redundant-Tiny entered through the screen of FIG. 14), the user may enter the name of a machine (e.g., Unified IP Server 1, Unified IP Server 2, etc.) to identify the machine to which the additional server is to be added.

Once a machine has been identified, the user may place a cursor controlled by a mouse over one of the options shown in FIG. 18 (e.g., Standalone M2 Server, CTI Server, Director Portal Server, Recording Database Server, etc.) and activate a switch on the mouse to select the additional server. The user may then enter a name of the additional server in the corresponding interactive box shown in FIG. 18. The user may repeat the process until the desired number of additional servers has been added. If the user should change his/her mind, then the user may activate the softkey labeled Remove Selected Server to remove a previously made selection. Upon activation of the NEXT softkey, the identified additional servers are saved to the configuration file. If the user had previously decided that no additional servers were required, then the user would activate the NEXT softkey without making any entries on the additional servers screen.

Figure 19:
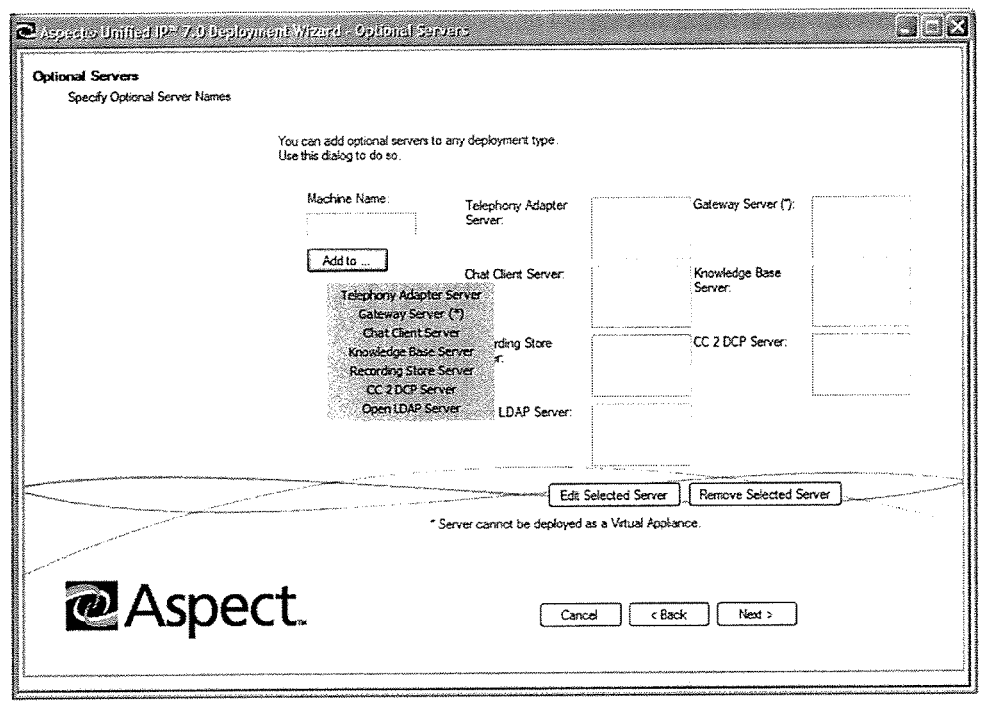
FIG. 19 depicts an interactive window for collecting information about optional servers used by the system of FIG. 1.
Figure 20:
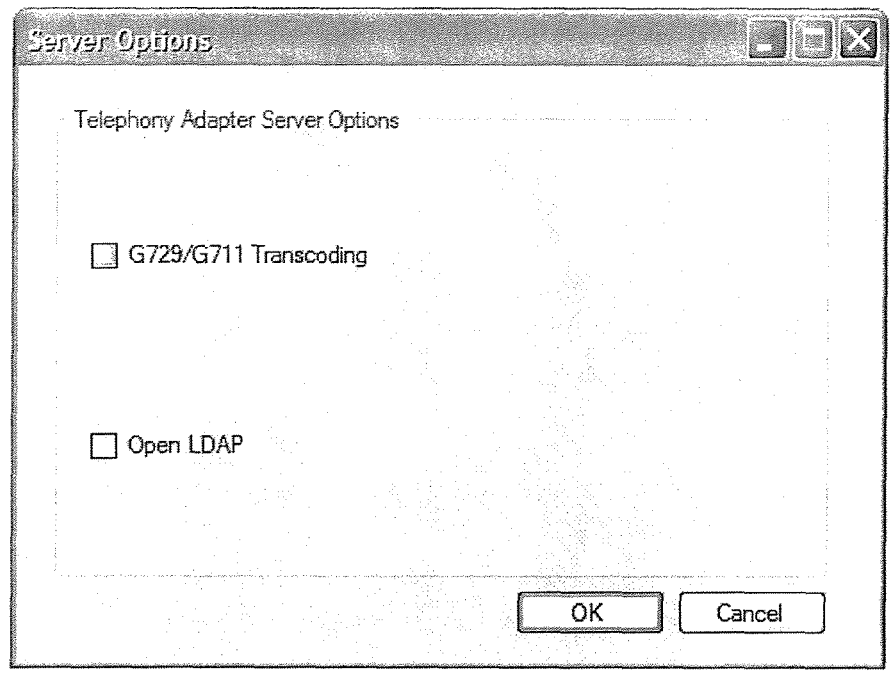
FIG. 20 depicts an interactive window for collecting information about server options used by the system of FIG. 1.
Figure 21:
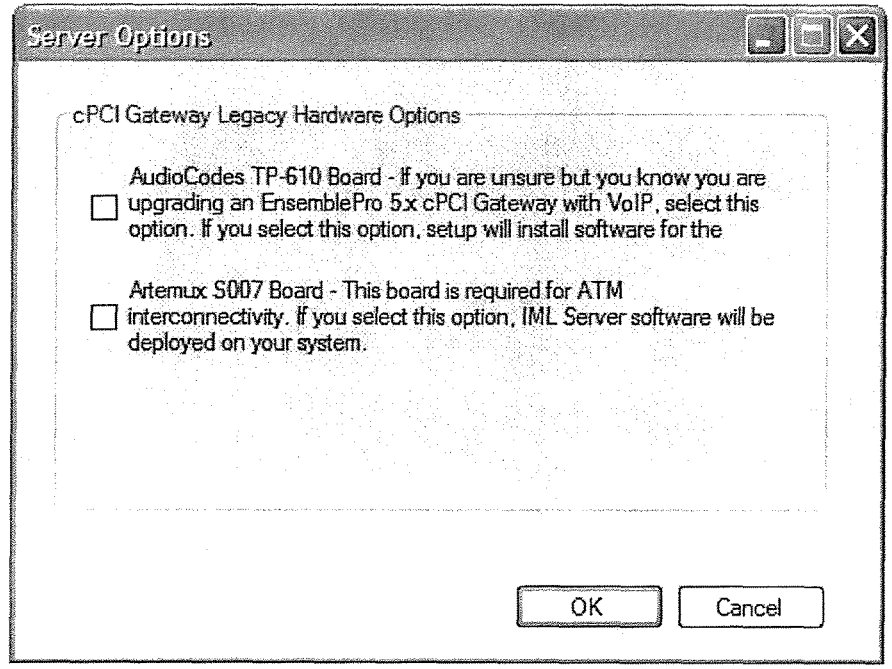
FIG. 21 depicts an interactive window for collecting information about legacy hardware options used by the system of FIG. 1.

Activation of the NEXT softkey on the additional servers screen of FIG. 18, may cause an optional servers software module to display an optional servers window such as that shown in FIG. 19 for adding optional servers. The optional servers window may be entirely driven the deployment type and DDXML 72. As above, the user can enter a machine name in a Machine Name window and select an optional server (e.g., Telephony Adapter Server, Gateway Server, Chat Client Server, Knowledge Base Server, Recording Store Server, CC 2DCP Server, Open LDAP Server, etc.) by placing a cursor over the descriptive title of the optional server and activating an associated switch. Once an optional server has been selected, the user can enter a system name in the interactive window with the same descriptive title.

In some cases, the addition of optional servers may require the entry of additional information. For example, the addition of a Knowledge Base Server may need login and authentication information for one or more databases. In this case, the user selects an optional server and then activates a softkey labeled Edit Selected Server. In response, an optional dialog window (e.g., FIG. 6) is displayed for the entry of the additional information. Upon activation of the NEXT softkey, the identified optional servers and additional information are verified and saved to the configuration file.

Figure 22:
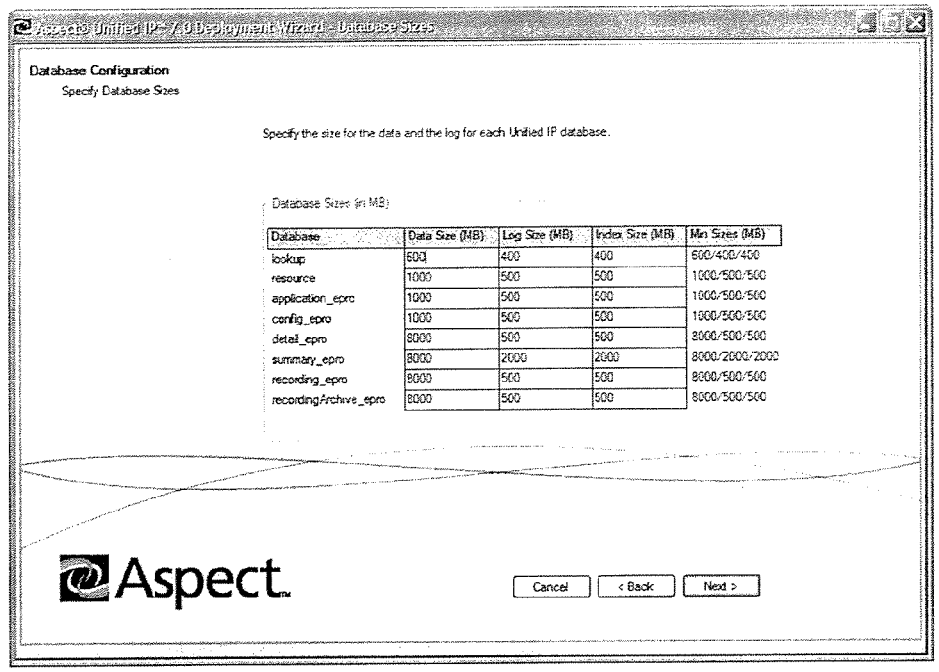
FIG. 22 depicts an interactive window for collecting information about database size used by the system of FIG. 1.

Following selection of any optional servers, a database configuration software module of the deployment wizard provides an interactive window such as that shown FIG. 22 to the user for entry of database information. The database configuration software calculates a minimum recommended size of the database based upon the information entered through the windows of FIGS. 3-21 and displays the recommended values as a composite in the right column and also as a break-out of initial values in the matrix of values. If the user should decide to select a different value, then the user may place his/her cursor over the intersection of a particular row (e.g., lookup, resource, application_epro, config epro, detail_epro, summary_epro, recording_epro or recordingArchive_epro) and column (e.g., Data Size, Log Size or Index Size) and activate an associated switch. The user may then enter his/her own selected value. Once the proper values of memory size have been entered, the user may activate the NEXT softkey to save the values into the configuration file.

Figure 23:
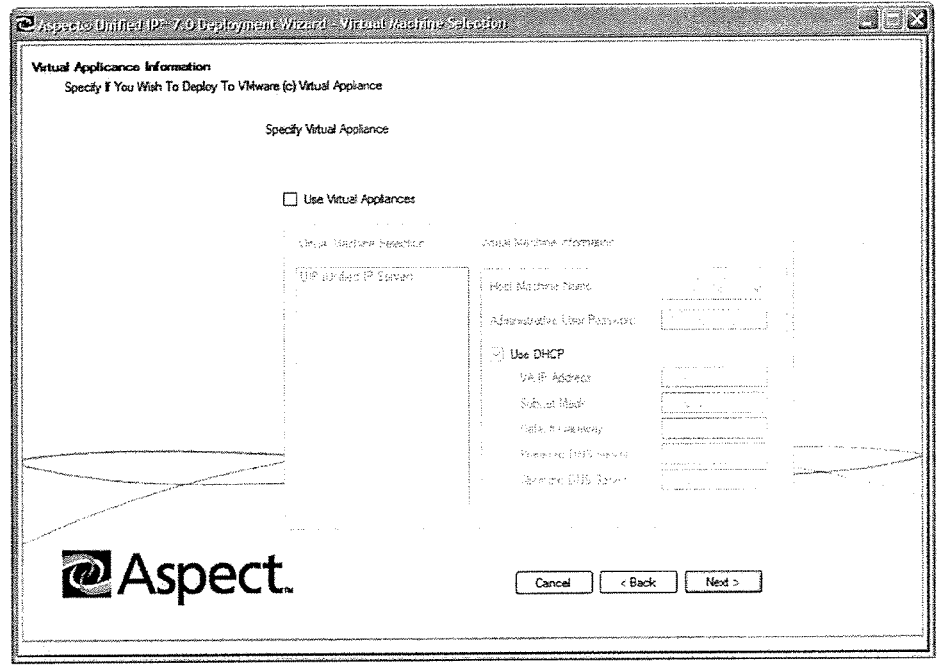
FIG. 23 depicts an interactive window for collecting information about virtual appliances used by the system of FIG. 1.

Once the memory size has been selected, an appliance software module within the deployment wizard 58 may present the user with a virtual appliance selection screen such as that shown in FIG. 23. The window of FIG. 23 allows a user to select which, if any, of the servers to install via a virtual appliance. To elect to use one or more virtual appliances, the user may select an interactive box labeled "Use Virtual Appliance."

Once the user has elected to use virtual appliances, the boxes shown in phantom in FIG. 23 become active and allow a user to enter machine information for generating a software appliance for each server of the system 12. Shown in a left side of FIG. 23 is a relatively large window labeled Virtual Machine Selection and on the right side a relatively larger window labeled Virtual Machine Information. Within the left, Virtual Machine Selection window may be shown a list of mandatory, additional and optional servers.

To use the screen of FIG. 23, a user may select the servers in the Virtual Machine Selection window, one at a time, and enter the appropriate information into the Virtual Machine Information window. In this case, the deployment wizard may present a number of sub-windows within the Virtual Machine Information window appropriate to the server to be installed.

In the example shown in FIG. 23, the only mandatory server shown in the Virtual Machine Section window is a "UIP (Unified IP Server)" that would have been previously identified to the deployment wizard by the user through the window of FIG. 3. The user may select the UIP (Unified IP Server) and the deployment wizard may, by reference to the DDXML, determine the scope and content of the Virtual Machine Information necessary to generate a software appliance to automatically install the UIP (Unified IP Server). In this case, the deployment wizard may present a first interactive window labeled "Host Machine Name" and a second window labeled "Administrative User Password." The deployment wizard may also provide an interactive check box for choosing a DHCP addressing system. The user may enter a host machine name and an administrative user password and activate the NEXT softkey.

Alternatively, the user may also select the Use DCHP box. If the user selects the DCHP box, then the user may also enter addressing information such as a VA IP Address, Subnet Mask, Default Gateway, Preferred DNS Server and Alternate DNS Server in a respective interactive box and, then activate the NEXT softkey.

Figure 24:
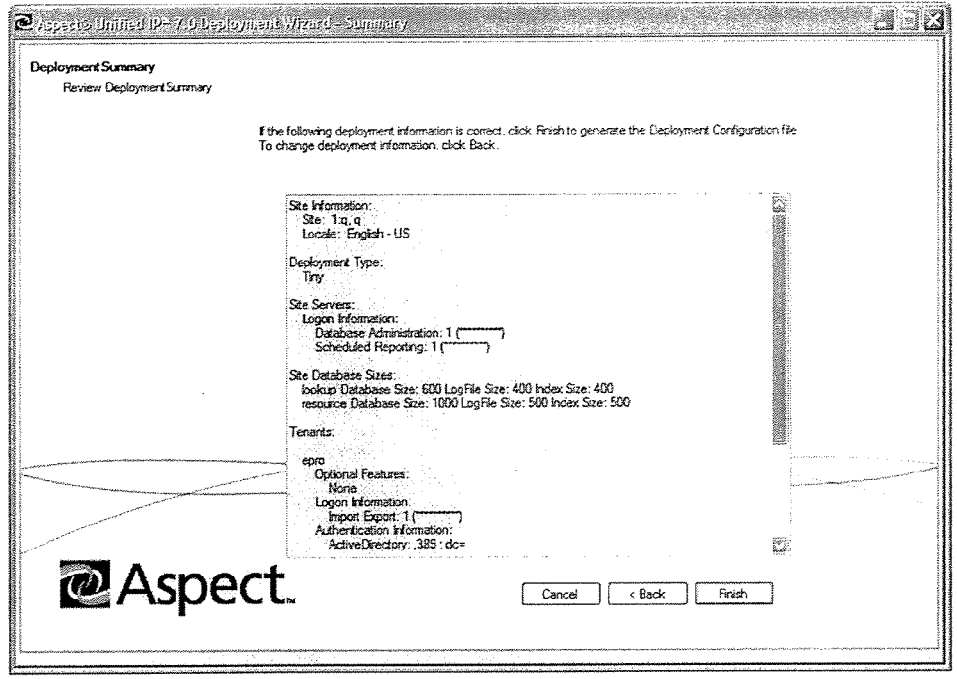
FIG. 24 depicts a summary screen provided by the system of FIG. 1.

Once the user activates the NEXT softkey on the screen of FIG. 23, the deployment wizard may prepare a summary of the deployment and display the information in a screen such as that shown in FIG. 24. The information may be verified by the user for accuracy. Should any information be incorrect or need to be updated, a BACK softkey is provided.

Following is another example of the use of the deployment wizard 58. In the previous example, the deployment wizard 58 was used to create a configuration file for a single tenant deployment. In this case, the deployment wizard 58 may be used to generate a configuration file 64 for a multi-tenant deployment.

Figure 25:
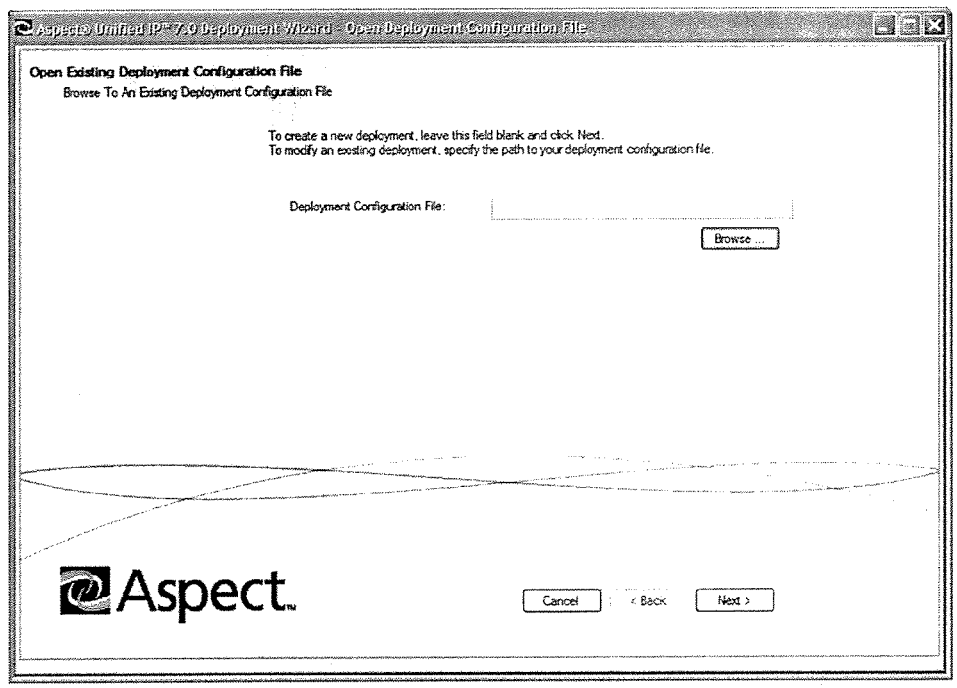
FIG. 25 depicts an interactive window for identifying a configuration file for a multi-tenant installation used by the system of FIG. 1.

In order to create a configuration file 64 for a multi-tenant, the user may activate the deployment wizard 58 and a configuration file software module within the deployment wizard 58 may display a configuration file identification screen similar to that shown in FIG. 25. As with the previous example, the user may browse to select a name of an existing configuration file 64 or enter a name for a new file 64.

Figure 26:
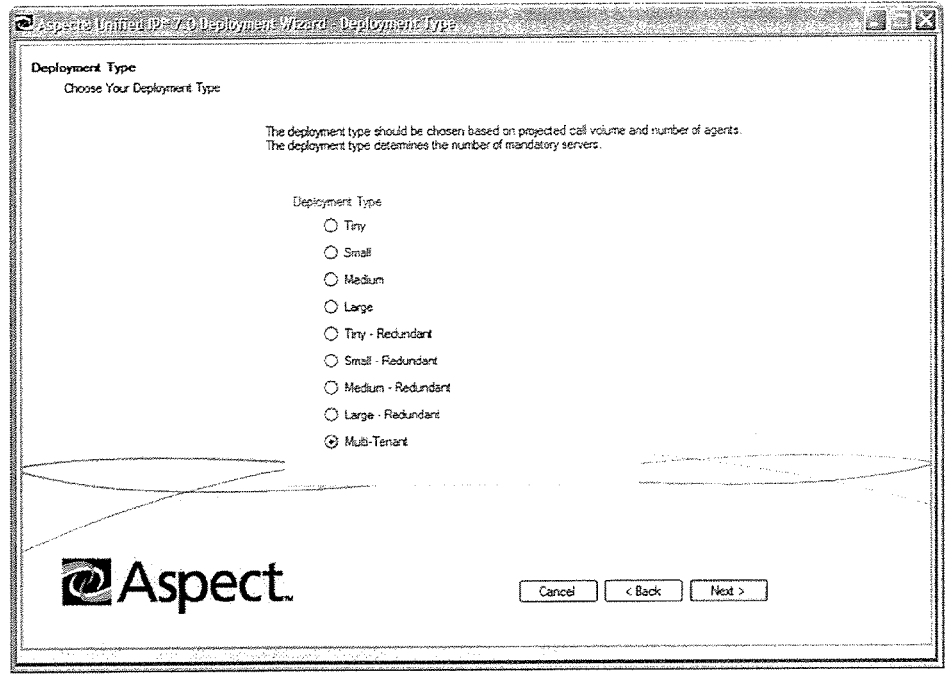
FIG. 26 depicts an interactive window for identifying a multi-tenant deployment type used by the system of FIG. 1.

Once the user has activated the NEXT softkey from the configuration file screen of FIG. 25, the deployment software module may display a deployment type screen such as that shown in FIG. 26 to the user. In this case, the user would check the interactive box labeled "Multi-Tenant" on the screen of FIG. 26. The user may then activate the NEXT softkey.

It should be noted in this regard that multi-tenant is an adjunct feature to the previously described deployment types. For example, multi-tenant simply allows a user to operate from a number of geographic locations in addition to a base site. If the user had opened a preexisting configuration file 64 before selecting a multi-tenant, then an underlying deployment type (e.g., Tiny, Small, Medium, Large, Tiny-Redundant, Small-Redundant, Medium-Redundant or Large-Redundant) may already be present within the configuration file 64.

Figure 27:
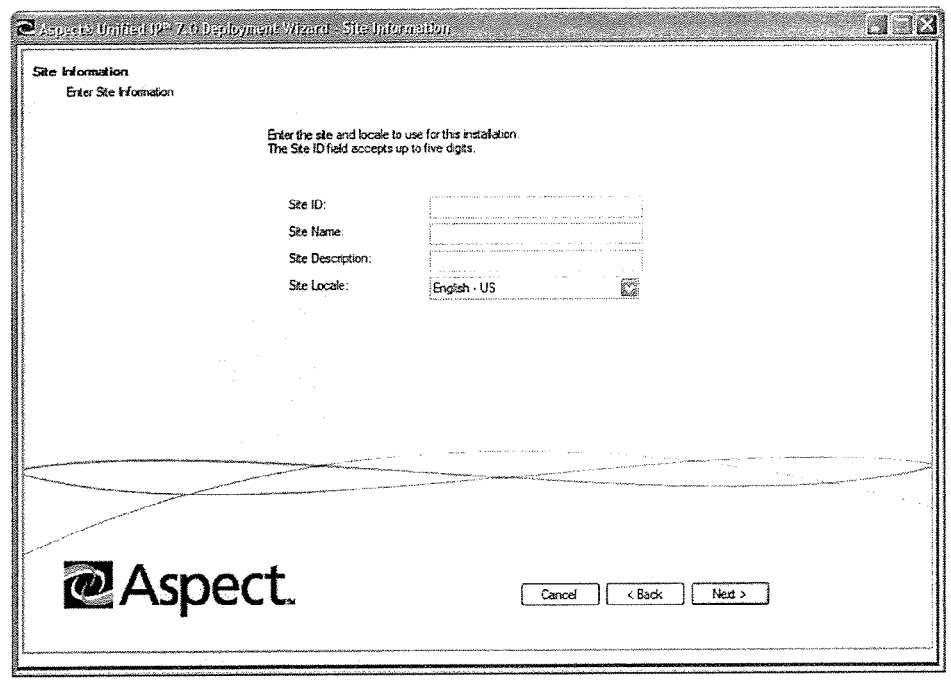
FIG. 27 depicts an interactive window for collecting multi-tenant site information used by the system of FIG. 1.

Once the NEXT softkey on the deployment type screen has been activated, the site information program module of the deployment wizard 58 may display a site information screen such as that shown in FIG. 27. In this case, the user may enter a Site ID, a Site Name, a Site Description and a Site Locale in a corresponding box in a manner similar to the previous example. The user may then activate a NEXT softkey.

Figure 28:
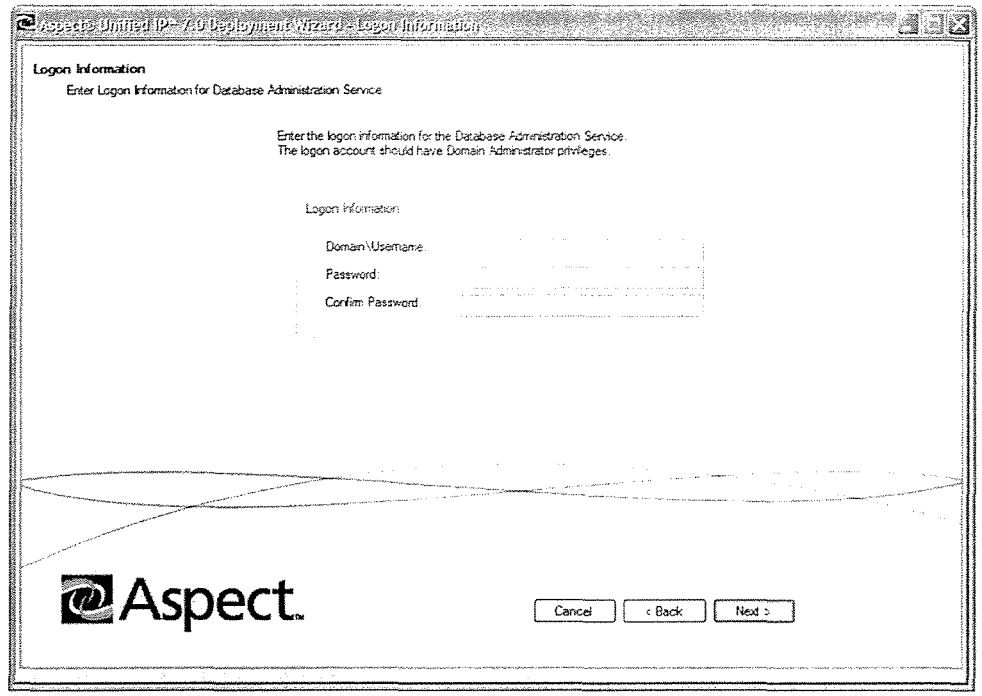
FIG. 28 depicts an interactive window for collecting logon information for multi-tenant data administration services used by the system of FIG. 1.

Upon activating the NEXT softkey on the deployment type screen, a database administration services program module may present a database administration services logon screen to the user such as that shown in FIG. 28. Within the database administration services logon screen, the user may enter a Domain/Username, a Password and a Confirming Password and respective interactive boxes and activate a NEXT softkey. The deployment wizard 58 may confirm the Domain/Username and Password.

Figure 29:
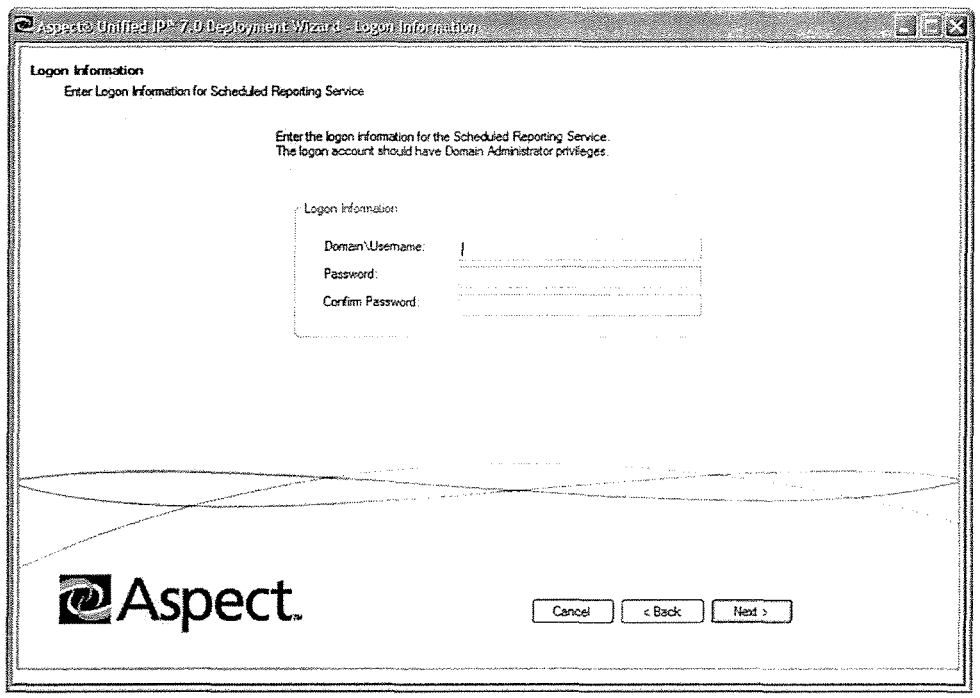
FIG. 29 depicts an interactive window for collecting multi-tenant scheduled reporting services information used by the system of FIG. 1.

Once the Domain Username and Password have been confirmed, the deployment wizard 58 may pass control to a scheduled reporting services program module. In response, the scheduled services program module may display a scheduled reporting services logon screen such as that shown in FIG. 29 to the user. Within the scheduled reporting services logon screen, the user may enter a Domain/Username, a Password and a Confirming Password and respective interactive boxes and activate a NEXT softkey. The deployment wizard 58 may confirm the Domain/Username and Password.

Figure 30:
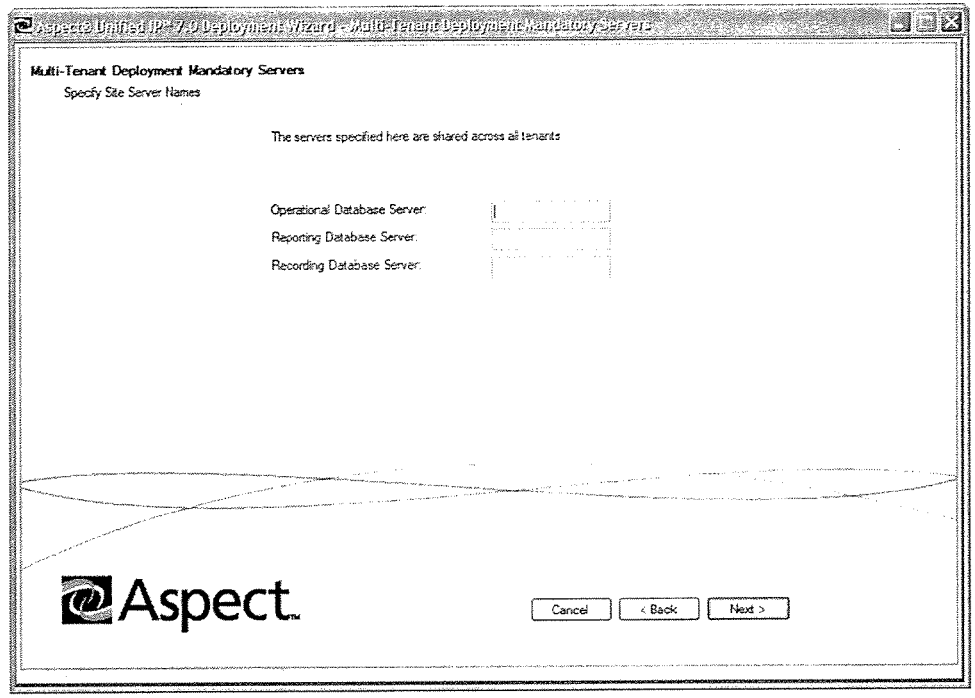
FIG. 30 depicts an interactive window for collecting multi-tenant mandatory server information for a tiny site used by the system of FIG. 1.

Once the Domain/Username and Password have been confirmed, the deployment wizard 58 may pass control to a multi-tenant mandatory servers program module. In response, the multi-tenant mandatory services program module may display a multi-tenant mandatory services logon screen such as that shown in FIG. 30 to the user. Within the multi-tenant mandatory services screen, the user may enter the system names of a Optional Database Server, a Reporting Database Server and a Recording Database Server in respective interactive boxes and activate a NEXT softkey. The deployment wizard 58 may validate the server names.

Figure 31:
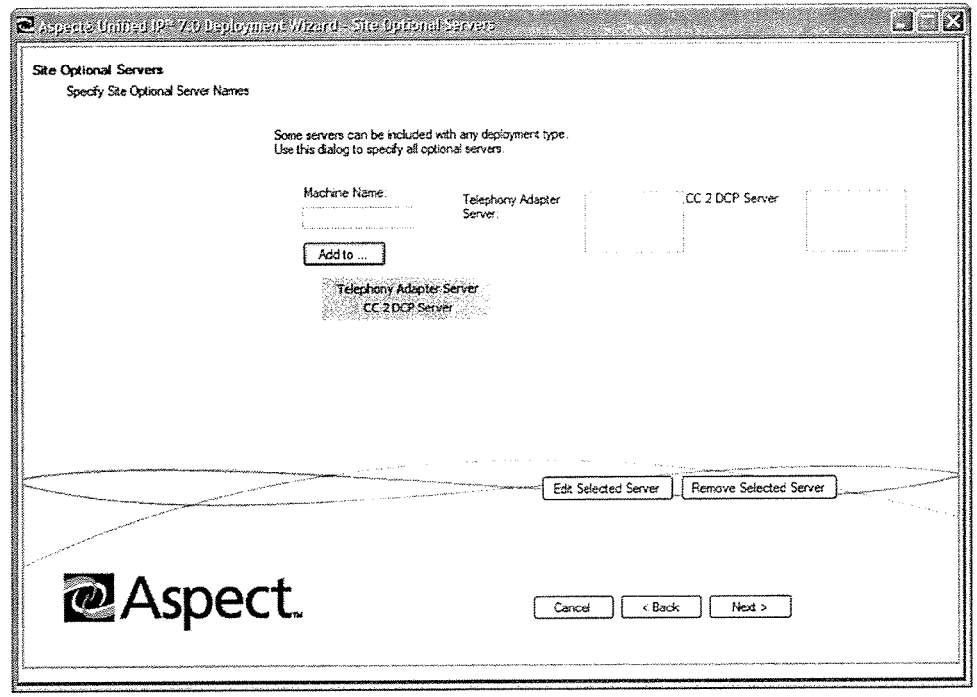
FIG. 31 depicts an interactive window for collecting multi-tenant optional server information for a tiny site used by the system of FIG. 1.

Once the names on the mandatory servers screen are verified, the deployment wizard 58 may activate an optional servers program module and display an optional site servers screen such as that shown in FIG. 31. In this case, the user may enter a system name in a Machine Name window. In response, the deployment wizard 58 may display a list of descriptive names of the optional servers in a grey-tone window shown below an Add to softkey. The user may select the optional servers one-at-a-time and enter a system name in a window adjacent the descriptive name. The functional names may indicate whether the optional server is a tenant server or site server.

The user may select optional servers one-at-a-time and enter machine names for each case and activate the "Add to" softkey. As the "Add to" softkey is activated, the deployment wizard 58 validates the machine name and saves the additions to the configuration file 64.

Figure 32:
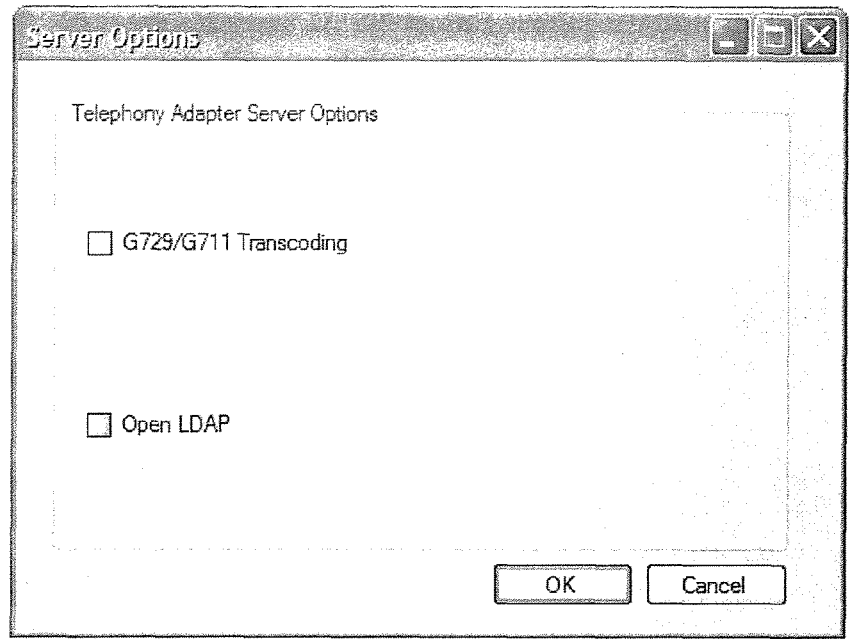
FIG. 32 depicts an interactive window for collecting multi-tenant information about server options used by the system of FIG. 1.

Once finished, the user may activate the NEXT softkey on the optional servers screen. In response, the deployment wizard 58 may activate a server options program module that display a server options screen such as that shown in FIG. 32 for at least some of the optional servers selected through the optional servers screen of FIG. 31. In the case of FIG. 31, the server options relate to the optional telephony adapter server of FIG. 31. In the case of FIG. 32, the options for the optional telephony adapter server include a selection of G729/G711 transcoding and for LDAP access.

Figure 33:
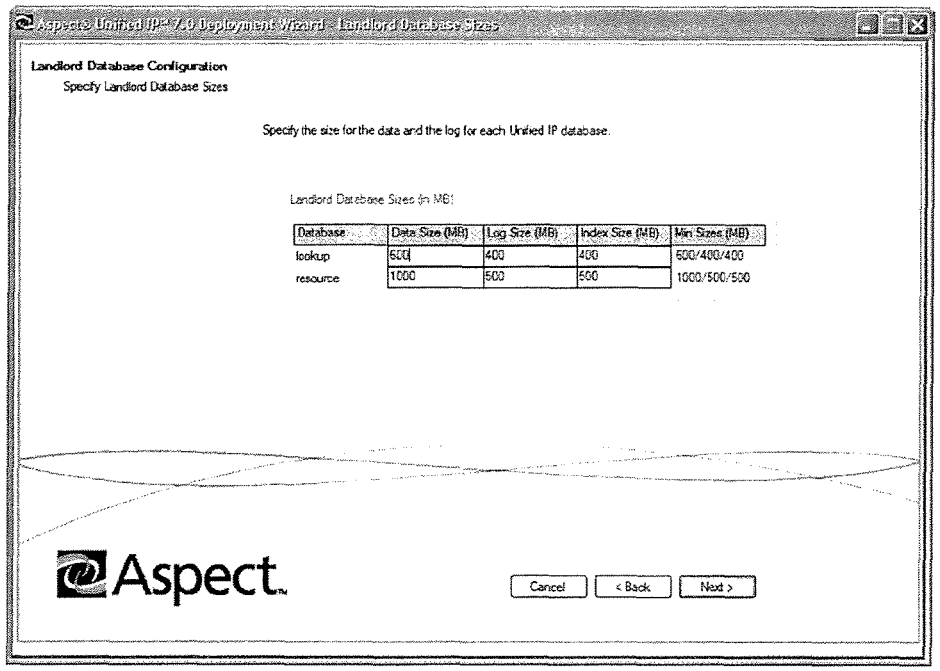
FIG. 33 depicts an interactive window for collecting multi-tenant information about landlord database configurations used by the system of FIG. 1.

Following completion of selection of options on the server options screen, the user may activate an OK softkey. The deployment wizard 58 may save the selected options in the configuration file and activate a landlord database program module that displays a landlord database configuration screen such as that shown in FIG. 33. In this case, the user may select the data size, the log size and index size one-at-a-time for the lookup and resource functions and make individual changes. The user may activate a NEXT softkey on the landlord database configuration screen to save the selected database sizes to the configuration file 64.

Figure 34:
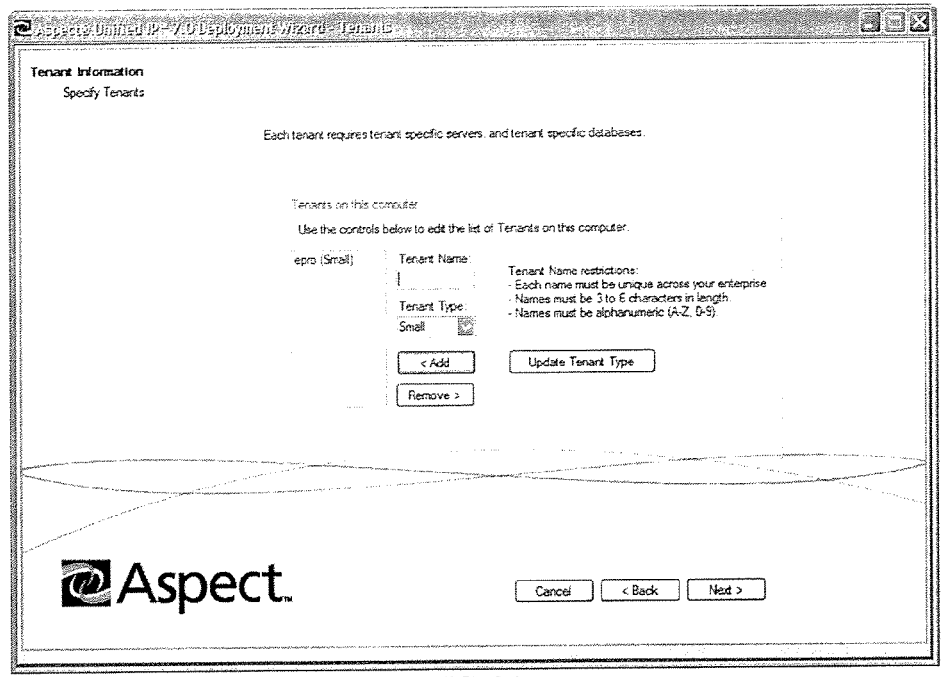
FIG. 34 depicts an interactive window for collecting information about tenants used by the system of FIG. 1.

Once the NEXT softkey on the landlord database configuration screen has been selected, the deployment wizard activates a specify tenants program module that displays a specify tenants screen such as that shown on FIG. 34. The specify tenants screen prompts the user for the tenants of the deployment. The default "epro" tenant may always be installed and, in some case, cannot be removed. The dialog is at least partially driven by the DDXML file 72.

Within the specify tenants screen, the user may select a tenant type from a menu labeled "Tenant Type" and enter a system name for the selected tenant type within an interactive window labeled "Tenant Name." The deployment wizard 58 determines a number of mandatory servers from the selected tenant type.

The user may add as many tenants by name and type as necessary. As each tenant is added, the added tenant is added to a list within the tenants window to the left side of the specify tenants screen. As each new tenant is specified by name and type, the user may activate an Add softkey to include the new tenant within the tenants list. Alternatively, the user may simply select a tenant name within the list and activate a Remove softkey to delete the tenant from the list. The user may also change a tenant type by first selecting a tenant name within the list, selecting a tenant type from the pull down menu labeled Tenant Type and activate an Update Tenant Type softkey. Once finished, the user may activate a NEXT softkey on the specify tenants screen to save the additions to the configuration file 64.

Figure 35:
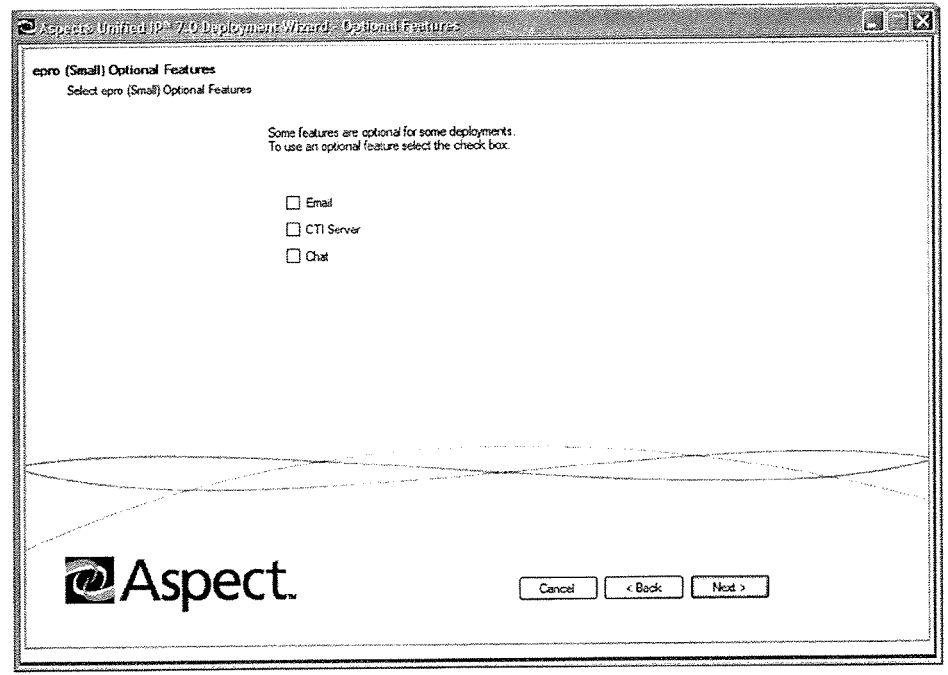
FIG. 35 depicts an interactive window for collecting information about option features used by the system of FIG. 1.

Once the tenants have been specified, the deployment wizard 58 may activate a tenant optional features program module that presents a series of optional features for each of the specified tenants in a tenant optional features screen such as that shown in FIG. 35. The use of this screen may be completely driven by the DDXML file 72.

Optional features that may be selected for each tenant in this case may include e-mail, a CTI server and Chat functions. An interactive check box may be provided for selection of these features for each tenant. As options for each tenant are selected, the user may activate the NEXT softkey. Once options for each tenant has been selected, the deployment wizard 58 may save the selected features to the configuration file 64.

Figure 36:
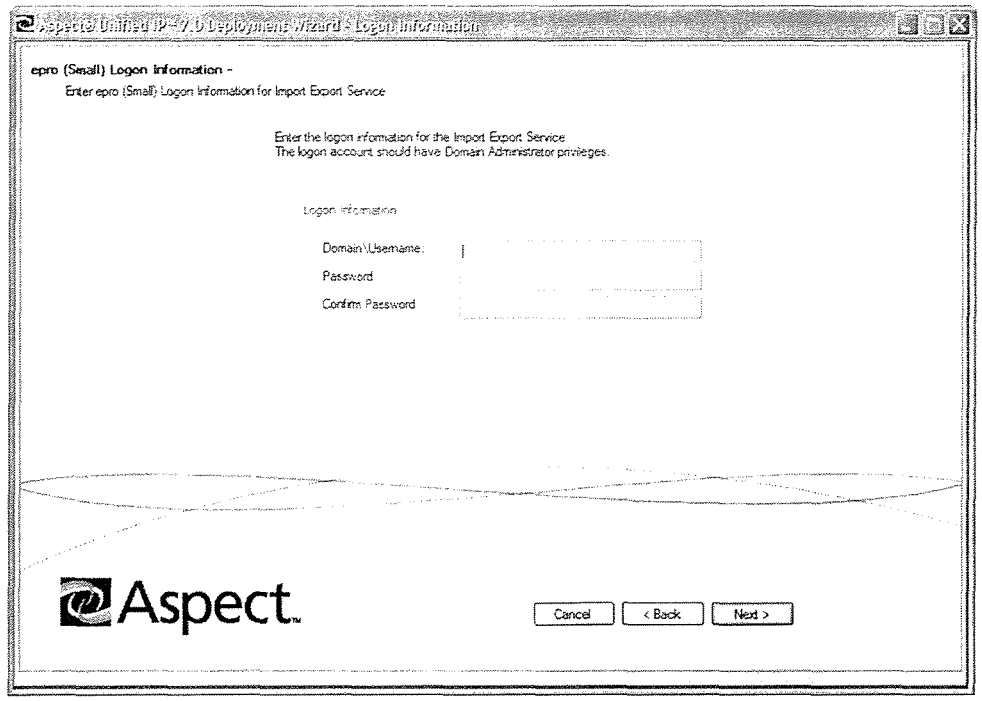
FIG. 36 depicts an interactive window for collecting information about import/export logon information used by the system of FIG. 1.

Once the optional features for each tenant has been specified, the deployment wizard 58 may activate a tenant logon program module that presents a series of logon information screens, such as that shown in FIG. 36 for each of the specified tenants. As each tenant information screen is presented, a name of the tenant may appear in the upper left corner. The user is then presented with a series of windows labeled Domain/Username, Password and Confirm Password where the user may inter the respective information. As the user activates the NEXT softkey, the next tenant logon screen is presented and the user enters the appropriate Domain/Username and Password.

Figure 37:
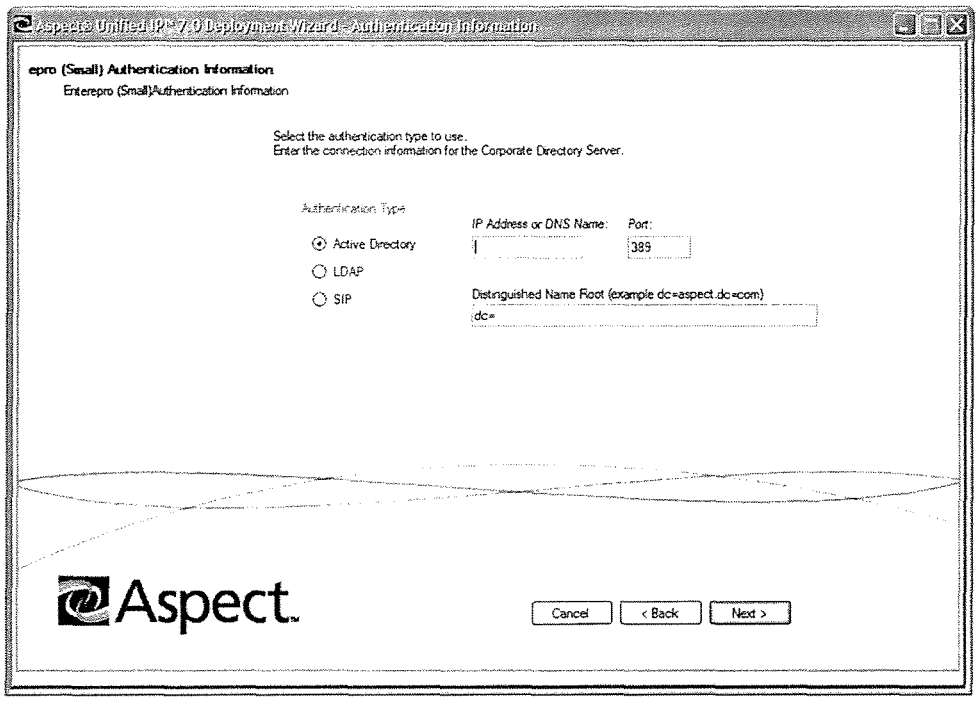
FIG. 37 depicts an interactive window for collecting information about authentication information used by the system of FIG. 1.

Once the tenant logon information has been entered for each tenant, the deployment wizard 58 may activate a tenant authentication program module and a tenant authentication information entry screen such as that shown in FIG. 37 may be presented to the user. As above, an identifier of the tenant may appear in the upper left corner.

In each case, the user will be prompt to check an interactive box selecting either an Active Directory, an LDAP or SIP and to enter an IP address or DNS name for authentication. The port number will be assumed to be 389 unless changed by the user. In the case of an active directory or LDAP, the user will also be prompted for a root directory.

As the user enters authentication information for each tenant, the user may activate the NEXT softkey at the bottom of the tenant authentication information entry screen. Each time the user activates the NEXT softkey, the user is prompted for authentication information for the next tenant.

Figure 38:
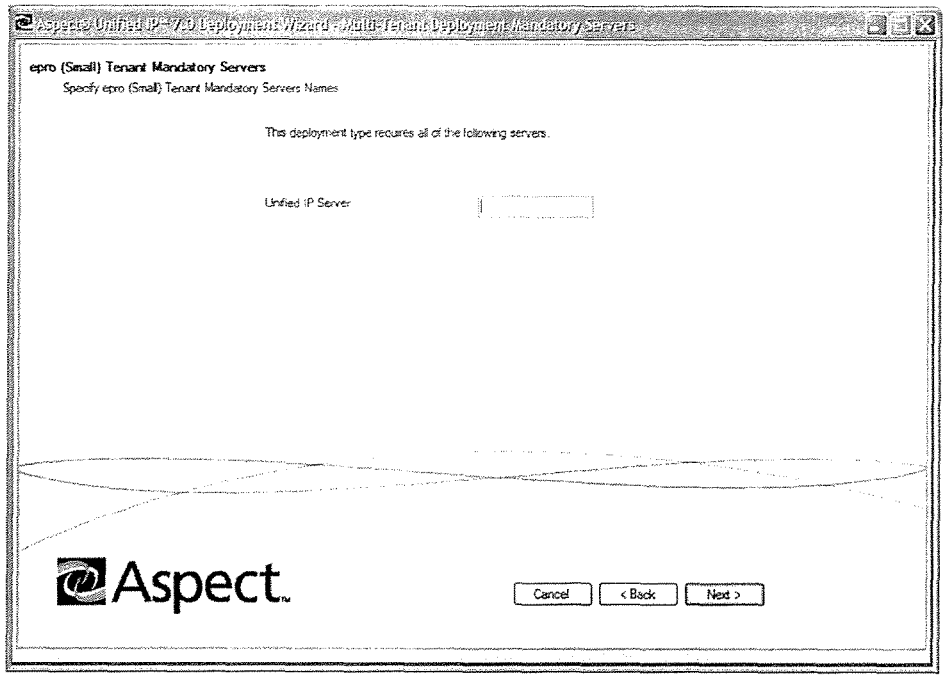
FIG. 38 depicts an interactive window for collecting information about mandatory servers for small tenants used by the system of FIG. 1.

Once the user activates the NEXT softkey for the tenant authentication information entry screen for the last tenant, the deployment wizard 58 may activate a tenant mandatory server program module that presents the user with a tenant mandatory server name entry screen such as that shown in FIG. 38. This screen is driven almost entirely by the DDXML file 72 based upon the tenant type selected in the screen of FIG. 34.

Figure 39:
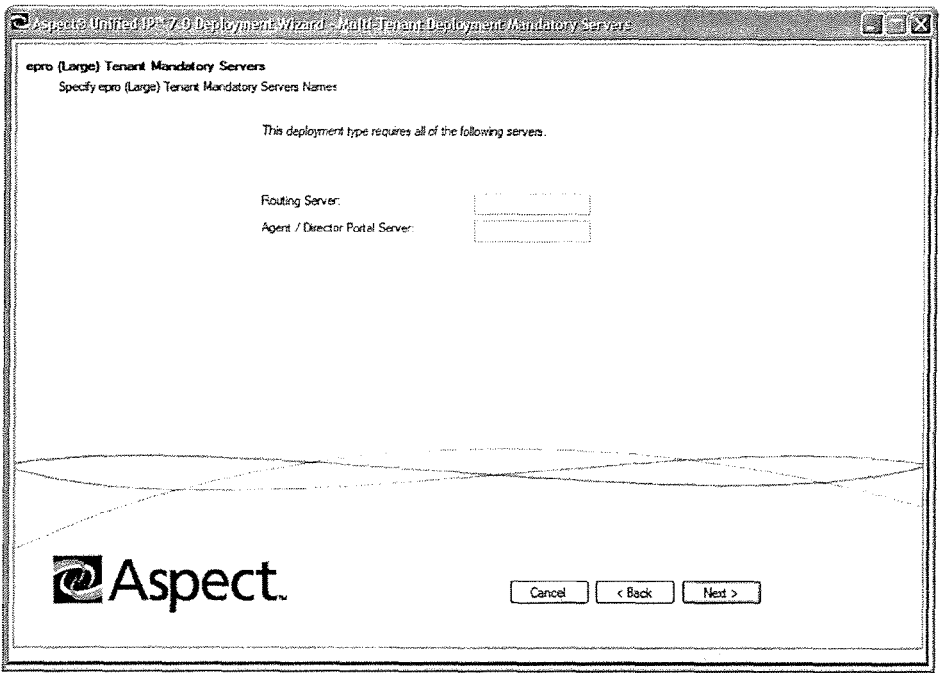
FIG. 39 depicts an interactive window for collecting information about mandatory servers for large tenants used by the system of FIG. 1.

Shown in the upper left corner of the tenant mandatory server screen is a tenant identifier. Also shown is a list of mandatory servers for the tenant type along with a window for entry of a server name beside the identifier of each mandatory server. As each tenant mandatory server name entry screen is presented, the user may enter a name for each mandatory server and activate the NEXT softkey at the bottom of the screen. The deployment wizard 58 verifies that the name is unique and presents the next mandatory server name entry screen for the next tenant. In each case, the deployment wizard 58 presents the number of mandatory servers (FIGS. 38, 39) based upon the tenant type, verifies the proper form of the entered name and saves the name into the configuration file 64.

Figure 40:
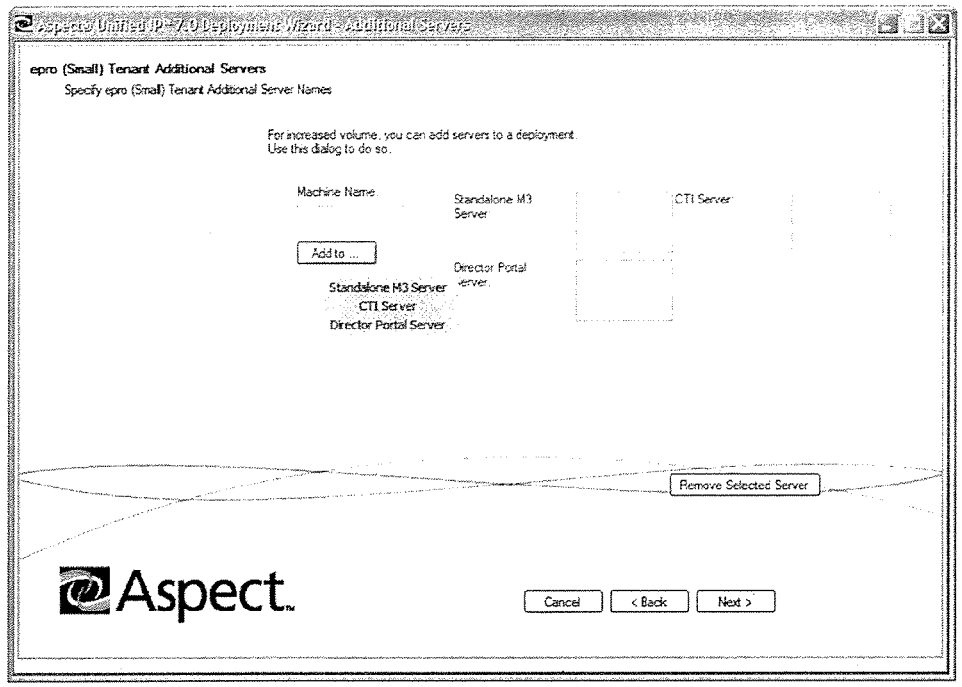
FIG. 40 depicts an interactive window for collecting information about additional servers used by the system of FIG. 1.

Once the deployment wizard 58 has received names for each of the mandatory servers, the deployment wizard 58 may activate a tenant additional servers program module and presents a tenant additional servers screen such as that shown in FIG. 40 to the user. In this case, the user may enter a system name in the Machine Name window and the program module retrieves optional additional servers based upon tenant type from the DDXML file 72.

As above, the tenant additional servers screen is provided with a list of descriptive names of optional servers. In each case, the user may select an optional server from one of the lists, enters a name in the window adjacent the descriptive name and activate the Add to softkey. The user may continue to add servers to each tenant until the user is satisfied followed by activation of the NEXT softkey.

Upon activation of the NEXT softkey, the user is taken to the tenant additional servers screen for the next tenant. The user continues to add servers until the last tenant has been processed in a similar manner. The deployment wizard 58 saves the added information to the configuration file 64.

Figure 41:
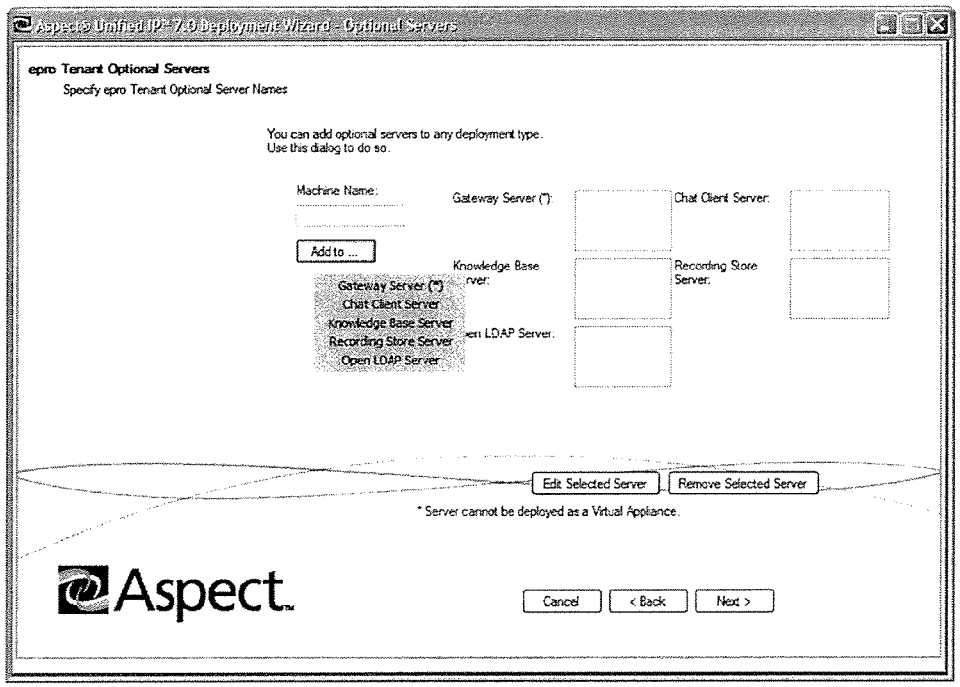
FIG. 41 depicts an interactive window for collecting information about optional servers used by the system of FIG. 1.

Once the deployment wizard 58 has received names for each of the additional servers, the deployment wizard 58 may activate a tenant optional servers program module that presents a tenant optional servers screen such as that shown in FIG. 41 to the user. In this case, the user enters a machine name in the Machine Name window and the program module retrieves optional servers based upon tenant type from the DDXML file 72.

As above, the tenant optional servers screen is provided with a list of descriptive names of optional servers. In each case, the user may select an optional server from one of the lists, enter a name in the window adjacent the descriptive name and activate the Add to softkey. The user may continue to add servers to each tenant until the user is satisfied followed by activation of the NEXT softkey. Editing softkeys such as a Edit Selected Server softkey and a Remove Selected Server softkey are provided to edit assigned names and the content of the added optional servers.

Upon activation of the NEXT softkey, the user is taken to the tenant optional servers screen for the next tenant. The user continues to add servers until the last tenant has been processed in a similar manner. The deployment wizard 58 saves the added information to the configuration file 64.

Figure 42:
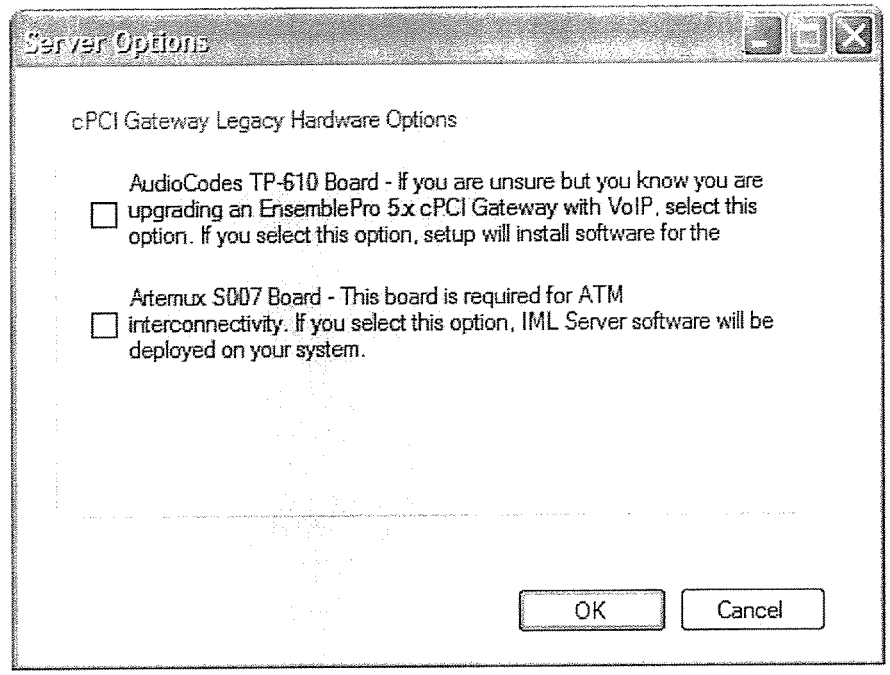
FIG. 42 depicts an interactive window for collecting information about hardware legacy options for multi-tenants used by the system of FIG. 1.

Following activation of the NEXT softkey on the tenant optional servers screen of the last tenant, the deployment wizard 58 activates a server options program module that presents a server options screen such as that shown in FIG. 42. In this case, the user is provided with a set of interactive check boxes for selection of connectivity options. The user may select one or more of the boxes to request the appropriate connectivity options and activate the OK softkey at the bottom of the server options screen.

Figure 43:
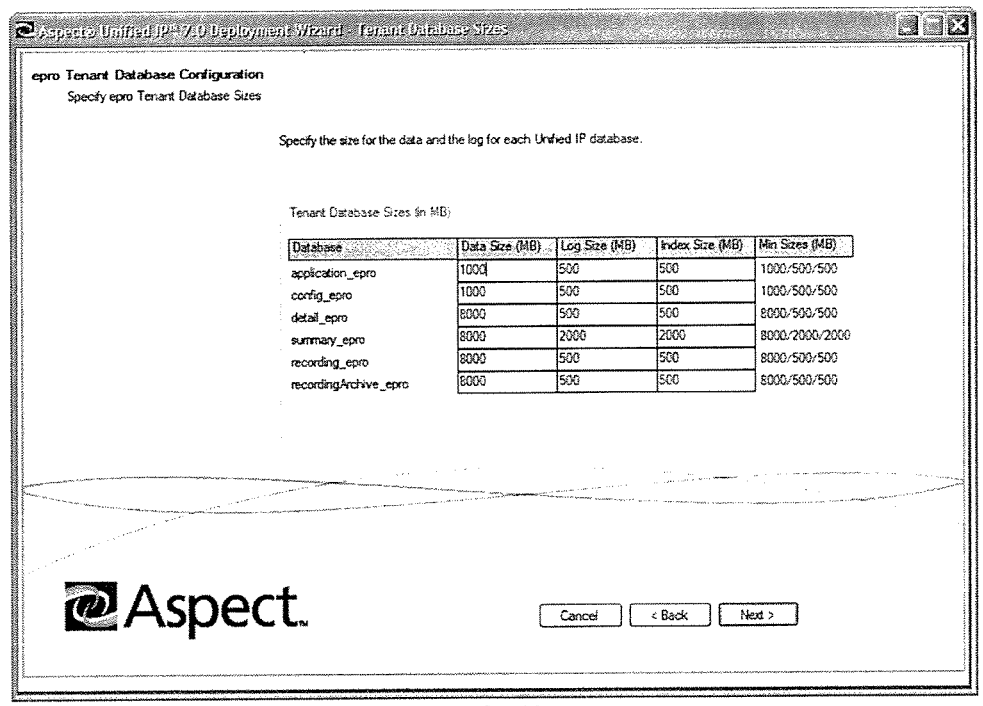
FIG. 43 depicts an interactive window for collecting information about database configurations used by the system of FIG. 1.

Following activation of the OK softkey at the bottom of the server options screen, the deployment wizard 58 may activate a tenant database configuration program module that presents a tenant database configuration screen such as that shown in FIG. 43. In this case, the user may be provided with a matrix of interactive windows. Along a first three column, starting from the left, the user may enter a data size, a log size and a index size. A fourth column from the left may simply display a recommended minimum memory size for each function. The rows on the database configuration screen may be provided with a database label along the left edge that indicates a database function (e.g., application_epro, config_epro, detail_epro, summary_epro, recording_epro and recordingArchive_epro, etc.). The user may select the windows one-at-a-time for each database function for data size, log size and index size and enter a desired database size or the user may simply accept the default minimum values that are automatically entered based upon the minimums shown in the column on the right side. Following entry of the appropriate database sizes, the user may activate the NEXT softkey to advance to the next screen.

Figure 44:
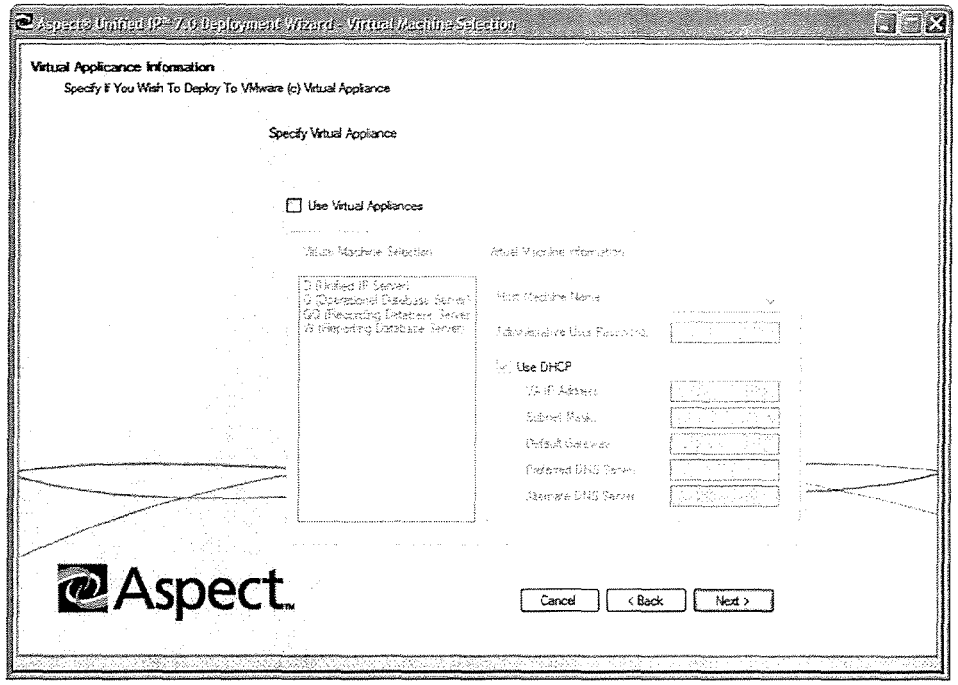
FIG. 44 depicts an interactive window for collecting information about multi-tenant virtual appliances for used by the system of FIG. 1.

Following entry of minimum database sizes on the tenant database configuration screen, the deployment wizard 58 may activate an appliance software module that may present a virtual appliance information screen such as that shown in FIG. 44. As initially displayed, the active features of the software appliance information screen may be shown in phantom until the user selects an interactive box labeled Use Virtual Appliances.

Once the user activates the Use Virtual Appliances window, the user is presented with a first window on the left for selection of virtual appliances and a right window for provisioning the virtual appliance for installation within the system 12.

The left window of the software appliance information screen is a Virtual Machine Selection window and may provide a list of virtual appliances that install to the mandatory, optional and additional servers selected from previous screens. In this case, the appliance software module processes the content of the configuration file 64 to determine a scope and content of the virtual appliances needed to configure the system 12.

By processing the content of the configuration file 64, the appliance software module generates and displays a list of virtual appliances in the Virtual Machine Selection window (e.g., Unified IP Server, Operational Database Server, Recording Database Server, Reporting Database Server, etc.). The user selects the virtual machine appliances within the Virtual Machine Selection window one-at-a-time and may customize the virtual machines within a Virtual Machine Information window shown on the right side of FIG. 44.

After the user selects a virtual machine in the Virtual Machine Selection window on the left, the user may enter a host machine name in the Host Machine Name interactive box of the Virtual Machine Information window and a password within the Administrative User Password box. The user may also check a Use DCHP box if the user wishes to use a dynamic host configuration protocol addressing scheme. If the user checks the DCHP box, then the user may also enter other DCHP information (e.g., a virtual appliance IP address within a VA IP Address interactive window, a subnet mask within a Subnet Mask interactive window, a default gateway within a Default Gateway window, a preferred DNS server within a Preferred DNS Server window, an alternate DNS server within an Alternate DNS Server window, etc.).

As the user selects subsequent virtual appliances within the list shown within the Virtual Machine Selection window, the previously entered information within the Virtual Machine Information window may be shown as default values for small systems 12. Alternately, where the configuration file 64 does not indicate host machine names for any of the virtual appliances (e.g., for larger systems 12), the user may be required to enter or re-enter virtual machine information within the Virtual Machine Information window.

The user may proceed through the list of virtual machines within the Virtual Machine Selection window entering virtual machine information for each virtual machine. Once complete, the user may activate the NEXT softkey to close the virtual appliances information window.

Figure 45:
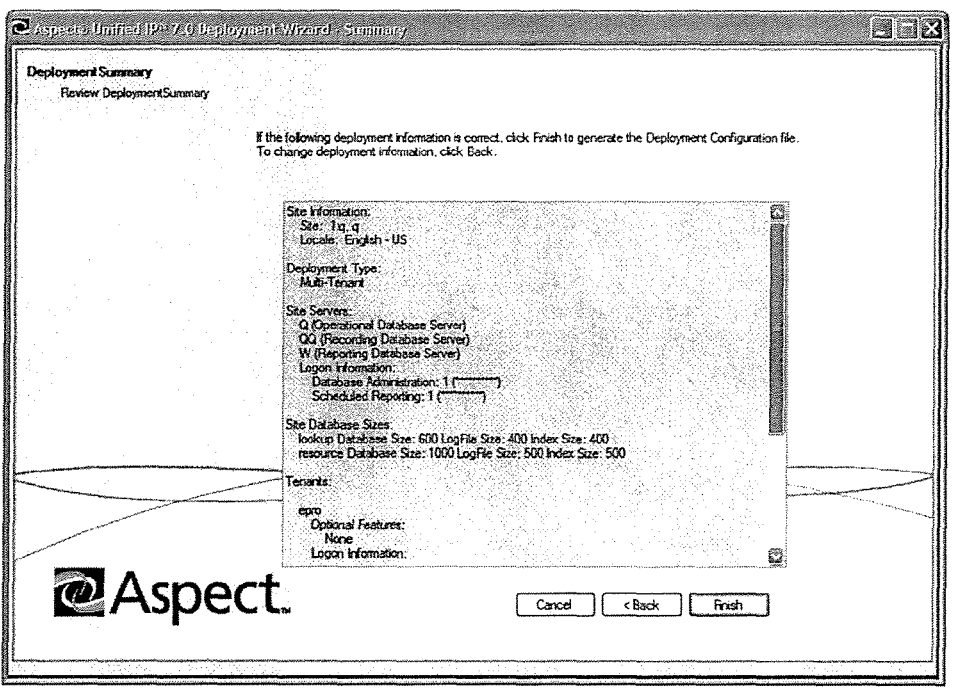
FIG. 45 depicts an interactive window with summary information generated by the system of FIG. 1.

Upon closing the virtual appliances information window, the deployment wizard 58 may activate a summary program module that may generate a summary window such as that shown in FIG. 45. The user may review the content of the summary window and go back to correct any errors by activating the BACK softkey or may complete the process by activating the FINISH softkey.

Figure 46:
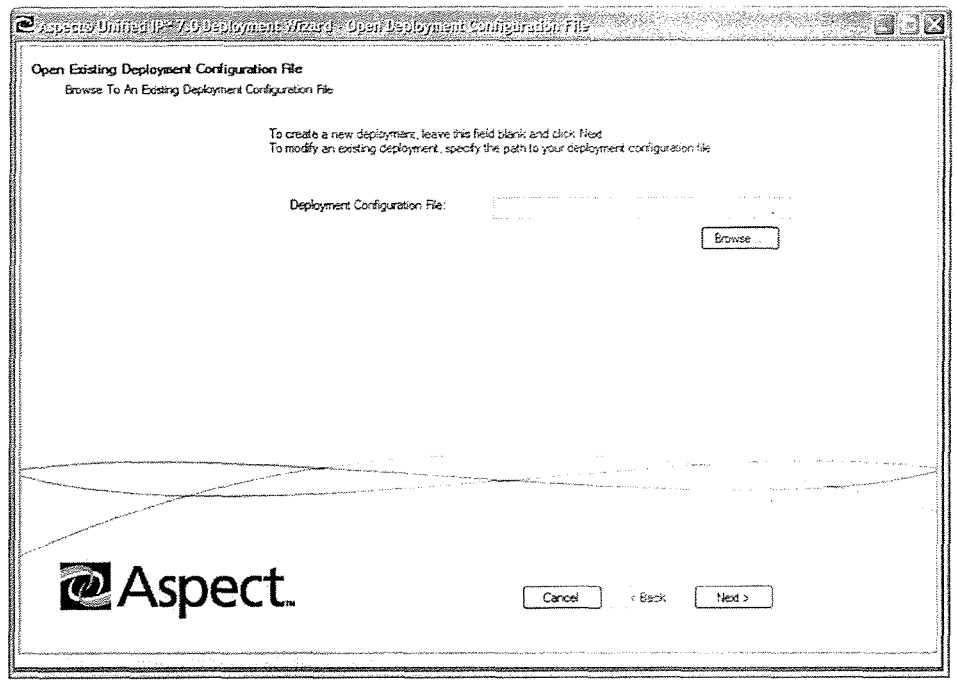
FIG. 46 depicts an interactive window on a computer screen for identifying a configuration file for a custom installation used by the system of FIG. 1.

As another example shown in FIGS. 46-61, the user may wish to combine servers or add further functionality as part of a custom deployment. As with previous examples, the deployment wizard 58 may present the user with a configuration file selection screen such as that shown in FIG. 46. The user may select an preexisting configuration file 64 by first activating the BROWSE softkey, selecting a file and activating the NEXT softkey or the user may open a new file by entering a name and activating the NEXT softkey.

Once the user has activated the NEXT softkey on the configuration file selection screen, the deployment wizard may activate the deployment type program module. The deployment type program module may present the user with the deployment type screen such as that shown in FIG. 47.

In this case, that the user would select the interactive check box labeled Custom. Following activation of the Custom check box, the user may activate the NEXT softkey.

Figure 47:
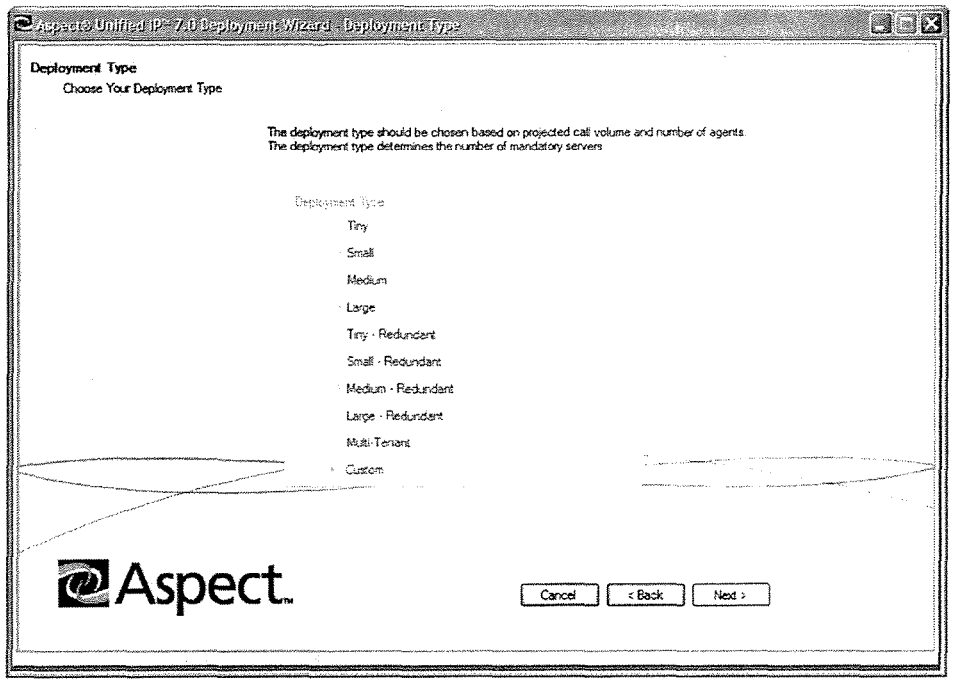
FIG. 47 depicts an interactive window for identifying a custom deployment type for a custom installation used by the system of FIG. 1.

It should be noted, in this case, that if the user had opened a preexisting configuration file, then activation of the Custom check box on the deployment type screen of FIG. 47 would change the preexisting configuration file 64 to a customized version of the preexisting file. In this way, a user can structure the system 12 using conventional features to reduce costs, yet still add customized features wherever necessary to meet the needs of the user.

Figure 48:
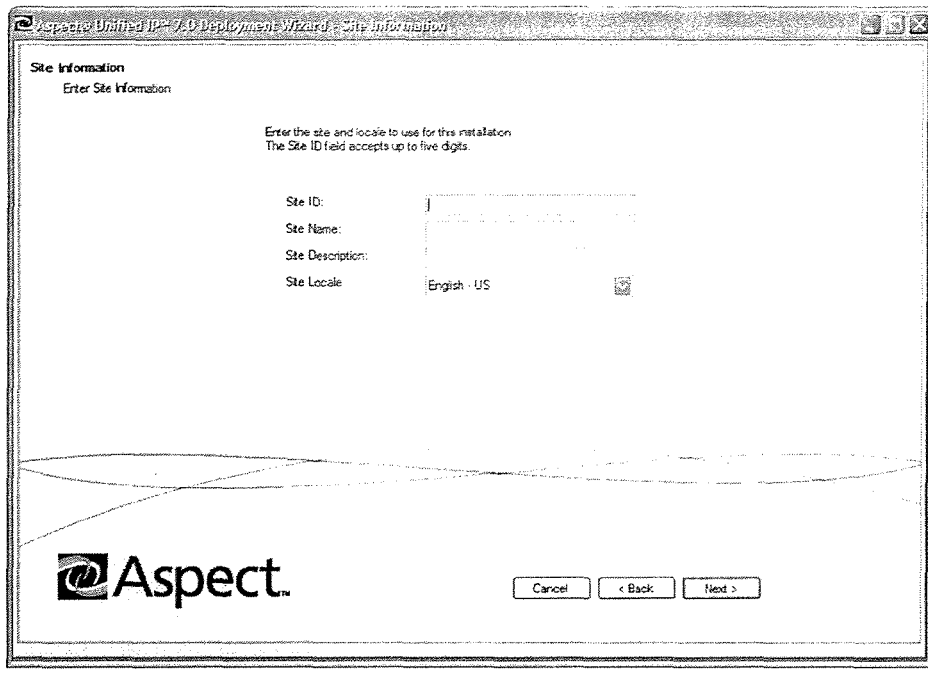
FIG. 48 depicts an interactive window for collecting multi-tenant site information for a custom installation used by the system of FIG. 1.

Following activation of the NEXT softkey on the deployment type screen of FIG. 47, the deployment wizard 58 may activate the site information program module and the site information program module may display a site information screen such as that shown on FIG. 48. If the user had opened a preexisting configuration file 64, then the Site ID box, the Site Name box, the Site Description box and the Site Locale box may be pre-populated with information from the preexisting configuration file 64. If the user had opened a new configuration file then the user would be required to enter a site ID in the Site ID box, a site name in the Site Name box, a site description in the Site Description box and a site locale in the Site Locale. When the user has completed the site information screen, the user may activate the NEXT softkey.

Figure 49:
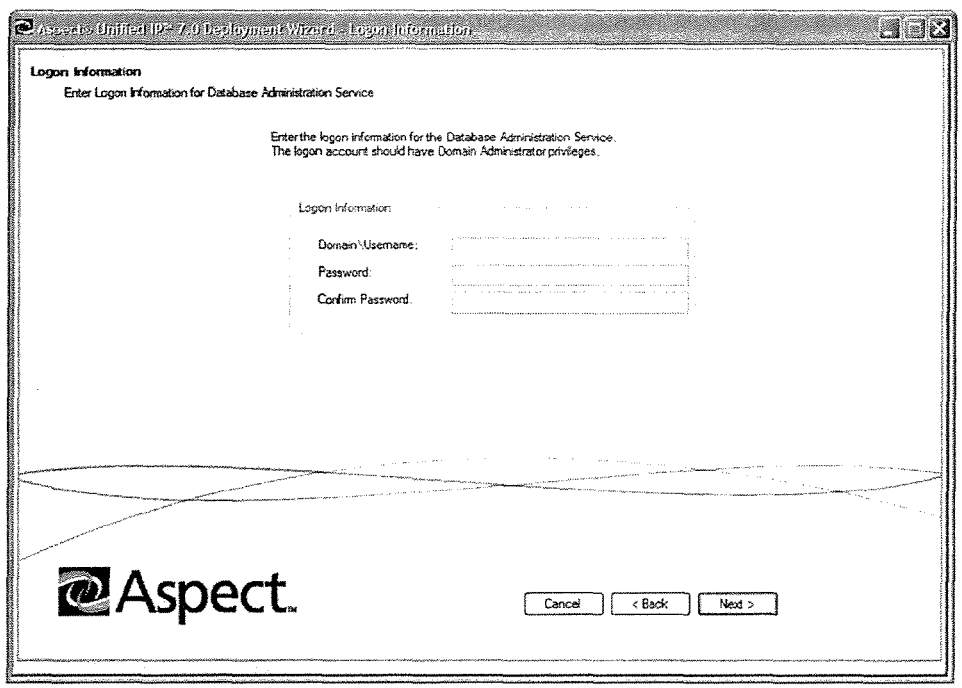
FIG. 49 depicts an interactive window for collecting logon information for data administration services used by the system of FIG. 1.

Once the user activates the NEXT softkey, the deployment wizard 58 may again activate a database logon program module that presents a database administration logon screen to the user such as that shown in FIG. 49. As above, if the user had opened a preexisting configuration file 64, then the Domain/Username box, the Password box and the Confirm Password box may be pre-populated with information from the preexisting configuration file 64. If the user had opened a new configuration file then the user may enter a domain/username in the Domain/Username box, a password in the Password box and a confirming password in the Confirm Password box. When the user has completed the database administration information screen, the user may activate the NEXT softkey.

Figure 50:
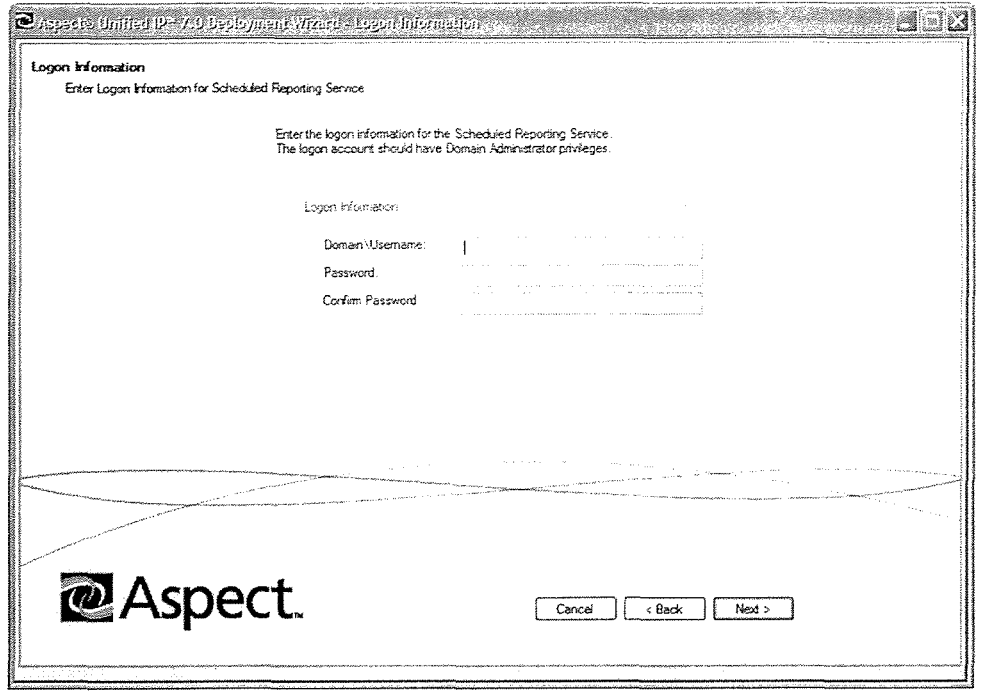
FIG. 50 depicts an interactive window for collecting custom scheduled reporting services information used by the system of FIG. 1.

Once the user activates the NEXT softkey on the database administration logon screen, the deployment wizard 58 may activate a reporting logon program module that may present a reporting logon information screen to the user such as that shown in FIG. 50. As above, if the user had opened a preexisting configuration file 64, then the Domain Username box, the Password box and the Confirm Password box may be pre-populated with information from the preexisting configuration file 64. If the user had opened a new configuration file then the user may be required to enter a domain/username in the Domain/Username box, a password in the Password box and a confirming password in the Confirm Password box. When the user has completed the reporting services logon screen, the user may activate the NEXT softkey.

Figure 51:
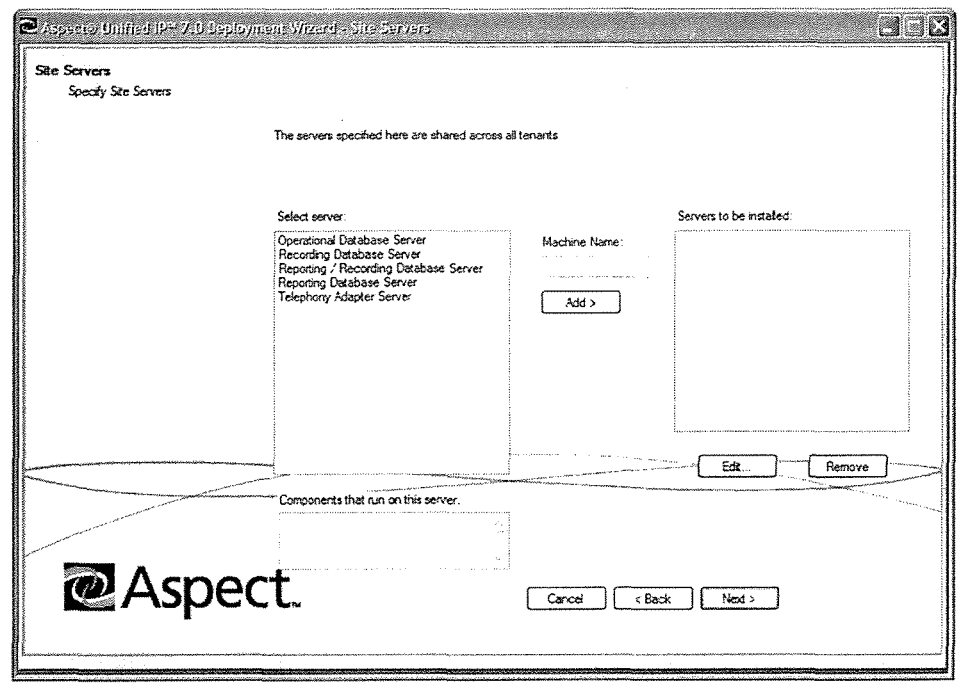
FIG. 51 depicts an interactive window for collecting custom mandatory server information for a tiny site used by the system of FIG. 1.

Upon activation of the NEXT softkey on the reporting logon information screen, the deployment wizard 58 activates a site server program module that may present a custom site servers screen such as that shown on FIG. 51. If the user had specified a preexisting configuration file, then a preexisting list of servers from the configuration file 64 may be displayed in the Select Server window of the specify site servers screen of FIG. 51 along with one or more additional servers.

In order to customize the installation, the user may select a server from the list within the Select Server window and activate the Add softkey. In response, the program module may display the selected server in the Servers to be installed window and any previously entered machine name in a Machine Name window. The program module may also display any components that could be run on the selected server in a Components that run on this server window.

To complete the customized server arrangement, the user may select additional components from the Components that run on this server window and again activate the Add softkey. By selecting additional components from the Components that run on this server window, the user can add additional functionality to each selected server. The user can also select the additional components and activate an Edit or Remove softkey to further customize the functionality of any added components.

By adding the additional functionality to each server, the user can addition additional functionality to the servers as a whole or can reduce the overall number of servers required. This can be especially important for some users that have server requirements that do not require the full complement of servers because of unique processing requirements.

Once the user has finished customizing the servers on the customized site servers window of FIG. 51, the user may active a NEXT softkey at the bottom of the screen. In response, the deployment wizard 58 may save the customized server arrangement to the configuration file 64.

Figure 52:
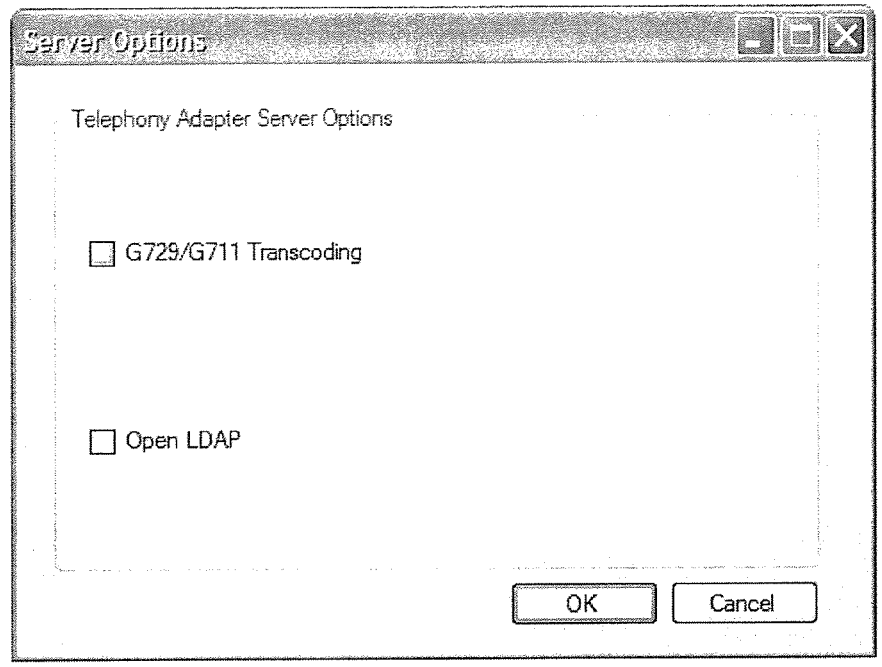
FIG. 52 depicts an interactive window for collecting custom optional server information for a tiny site used by the system of FIG. 1.

Once the customized server information is saved to the configuration file 64, the deployment wizard 58 may activate an adapter server options program module and present a telephony adapter server options screen to the user such as that shown in FIG. 52. In response, the user may select one or more interactive check boxes to further customize the transcoding and authentication features of the server and, then, activate an OK softkey to save and close the screen.

Figure 53:
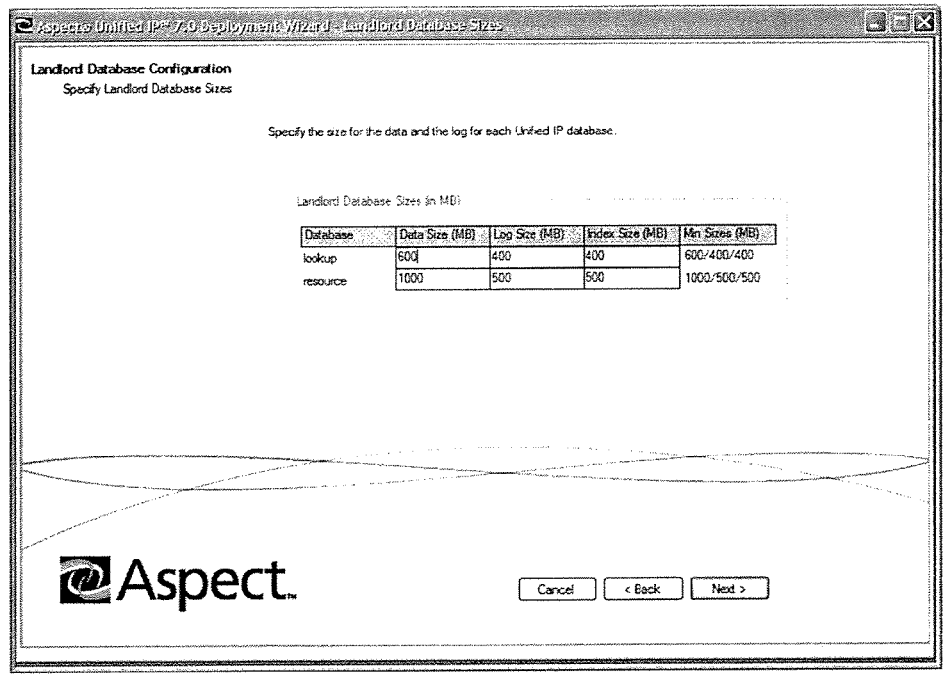
FIG. 53 depicts an interactive window for collecting custom information about landlord database configurations used by the system of FIG. 1.

The deployment wizard 58 may then activate a database program module and present a landlord database configuration screen to the user such as that shown in FIG. 53. A column on the right may show composite recommended minimum database sizes for lookup and resource features of the customized installation, while a second, third and fourth columns may show a breakout of a data size, a log size and index size for the lookup and resource features.

The user may individually select the data size, the log size and index size for the lookup and resource features and make changes as appropriate. The user may then select the NEXT softkey to close the landlord database configuration screen.

Figure 54:
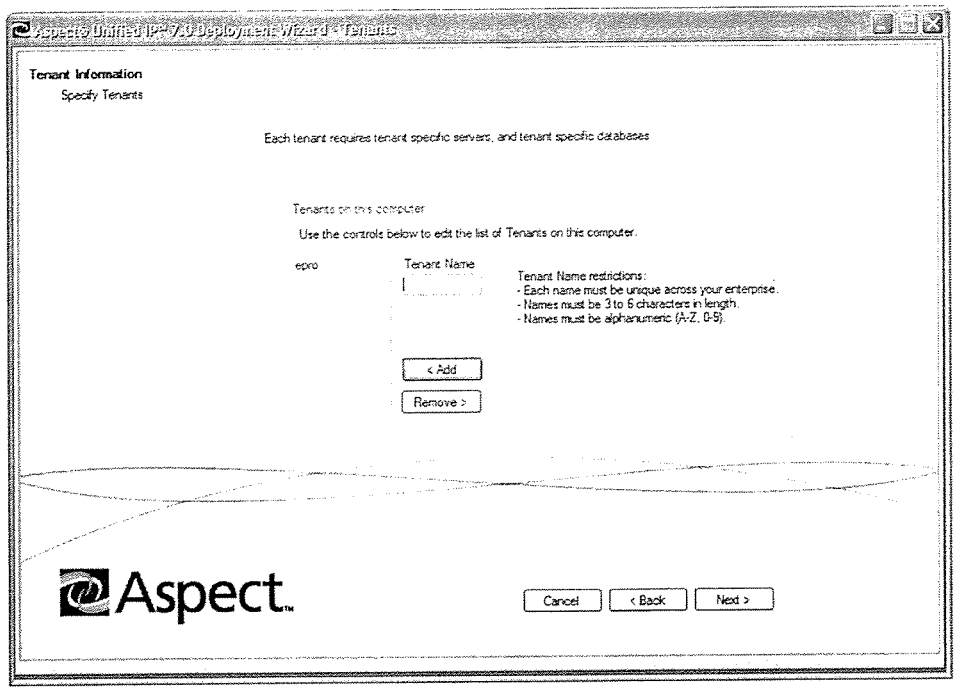
FIG. 54 depicts an interactive window for collecting information about tenants used by the system of FIG. 1.

The deployment wizard 58 may then activate a tenants program module and present a specify tenant information screen to the user such as that shown in FIG. 54. To add tenants, a user may select a Tenant Name box and enter a tenant name followed by activation of an Add softkey. As the name of each tenant is added, the tenant name is added to a tenant name list window shown on the left side of the tenant information screen. Once a complete list of tenants has been added, the user activates a NEXT softkey and the deployment wizard 58 saves the tenant information to the configuration file 64.

Figure 55:
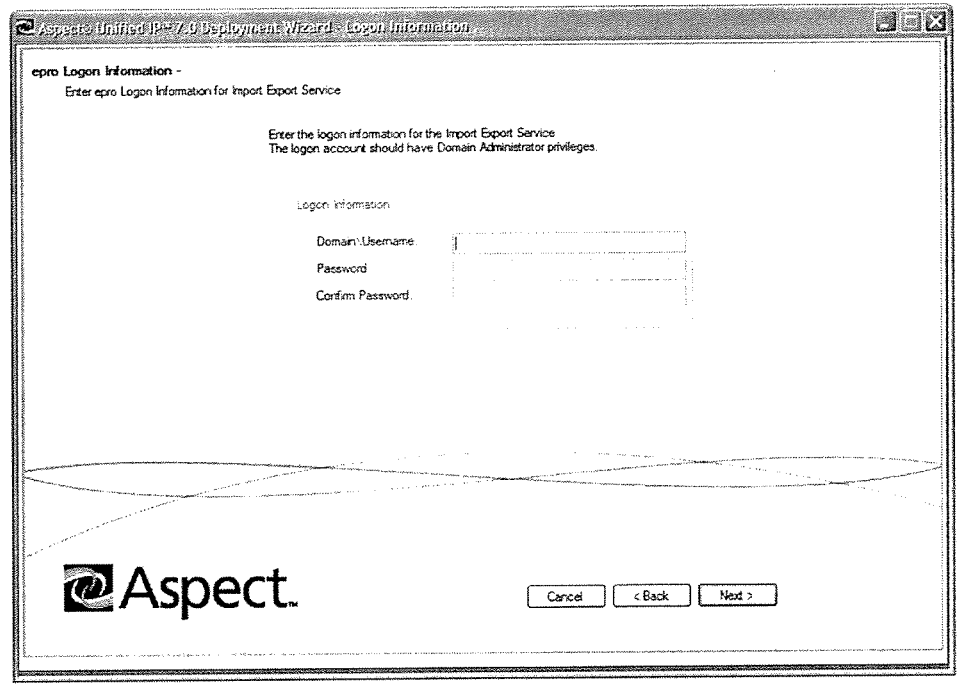
FIG. 55 depicts an interactive window for collecting logon information for import/export services used by the system of FIG. 1.

The deployment wizard 58 then actives a tenant logon software module and presents a tenant logon information screen to the user such as that shown in FIG. 55 for each of the specified tenants. As each tenant information screen is presented, a name of the tenant may appear in the upper left corner. The user is then presented with a series of windows labeled Domain/Username, Password and Confirm Password where the user may enter the respective information. As the user activates the NEXT softkey, the next tenant logon screen is presented and the user enters the appropriate Domain/Username and Password.

Figure 56:
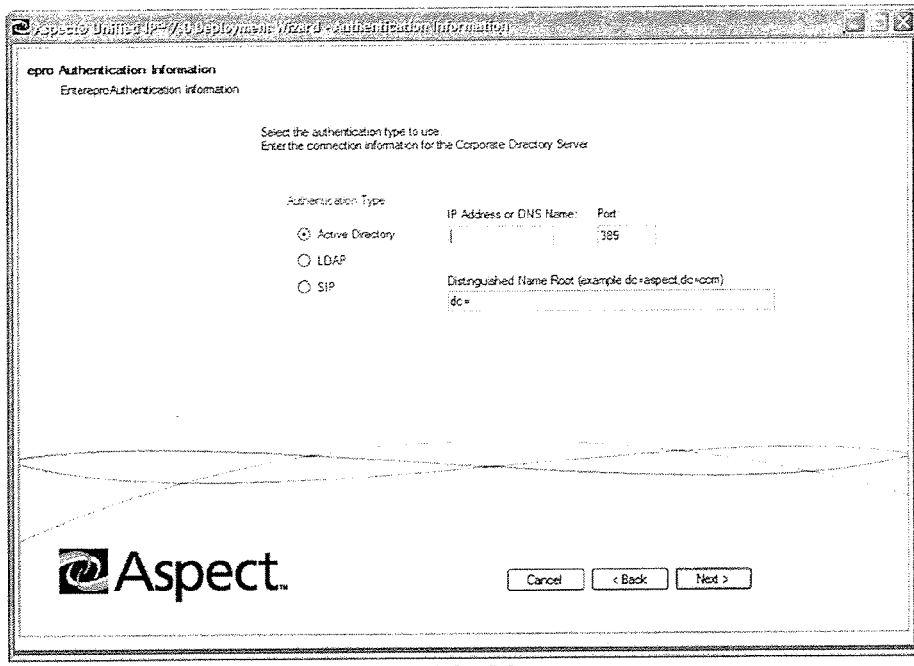
FIG. 56 depicts an interactive window for collecting authentication information used by the system of FIG. 1.

Once the tenant logon information has been entered for each tenant, the deployment wizard 58 may activate a tenant authentication program module and a tenant authentication information entry screen such as that shown in FIG. 56 may be presented to the user. As above, an identifier of the tenant may appear in the upper left corner.

In each case, the user will be prompt to check an interactive box selecting either an Active Directory, an LDAP or SIP and to enter an IP address or DNS name. The port number will be assumed to be 389 unless changed by the user. In the case of an active directory or LDAP, the user will also be prompted for a root directory.

As the user enters authentication information for each tenant, the user may activate the NEXT softkey at the bottom of the tenant authentication information entry screen. Each time the user activates the NEXT softkey, the user is prompted for authentication information for the next tenant.

Figure 57:
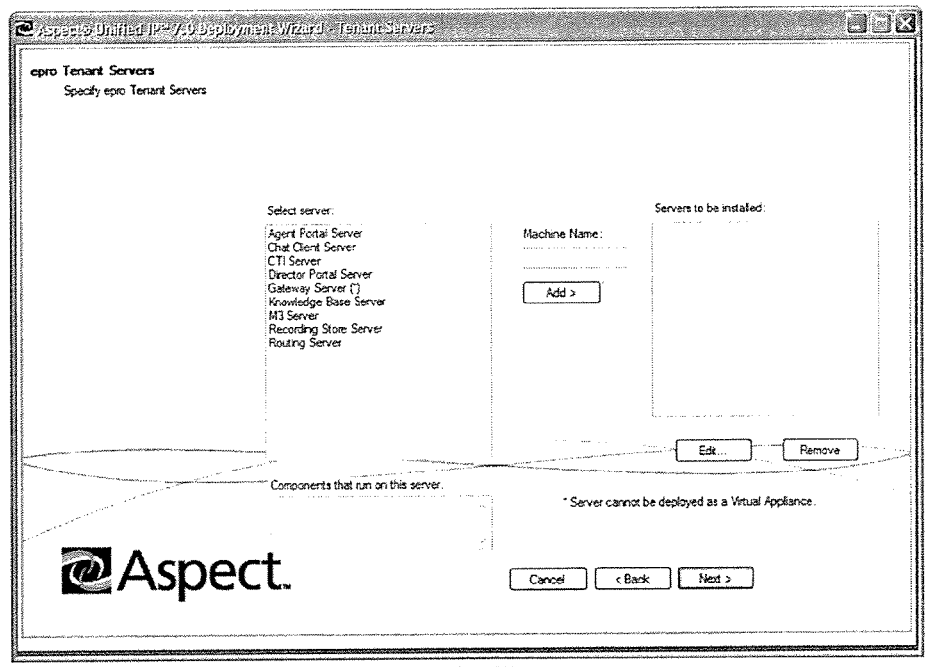
FIG. 57 depicts an interactive window for collecting information about servers for tenants used by the system of FIG. 1.

Once the user activates the NEXT softkey on the tenant authentication information entry screen for the last tenant, the deployment wizard 58 may activate a tenant server program module that presents the user with a specify tenant server name entry screen such as that shown in FIG. 57. This screen is driven almost entirely by the DDXML file 72 based upon a list of possible tenant servers that could be used.

Shown in the upper left corner of the tenant mandatory server screen is a tenant identifier. Also shown is a list of servers in a Select server window. In order to customize the installation, the user may select a server from the list within the Select Server window, enter a machine name in a Machine Name window and activate the Add softkey. In response, the program module may display the selected server in the Servers to be installed window. The program module may also display any components that could be run on the selected server in a Components that run on this server window.

To complete the customized server arrangement, the user may select additional components from the Components that run on this server window and again activate the Add softkey. By selecting additional components from the Components that run on this server window, the user can add additional functionality to each selected server. The user can also select the additional components and activate an Edit or Remove softkey to further customize the functionality of any added components.

By adding the additional functionality to each server, the user can addition additional functionality to the servers as a whole or can reduce the overall number of servers required. This can be especially important for some users that have server requirements that do not require the full complement of servers because of unique processing requirements.

Once the user has finished customizing the servers on the customized site servers window of FIG. 57, the user may active a NEXT softkey at the bottom of the screen. In response, the deployment wizard 58 may save the customized server arrangement to the configuration file 64.

Figure 58:
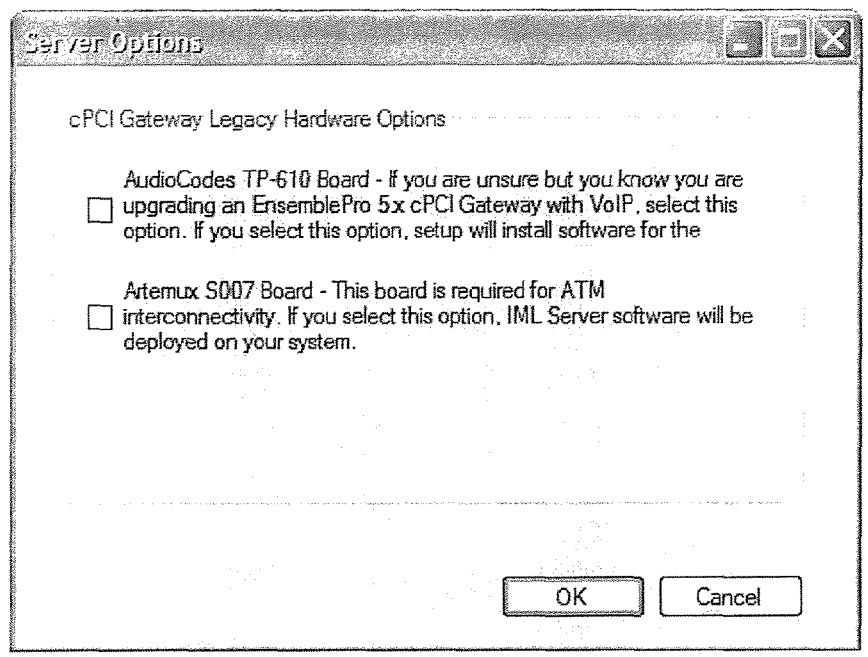
FIG. 58 depicts an interactive window on a computer screen for collecting information about multi-tenant hardware legacy options used by the system of FIG. 1.

Once the customized server information is saved to the configuration file 64, the deployment wizard 58 may activate a gateway legacy options program module and present a gateway legacy hardware options screen to the user such as that shown in FIG. 58. In response, the user may select one or more interactive check boxes to further customize the features of the server and, then, activate an OK softkey to save and close the screen.

Figure 59:
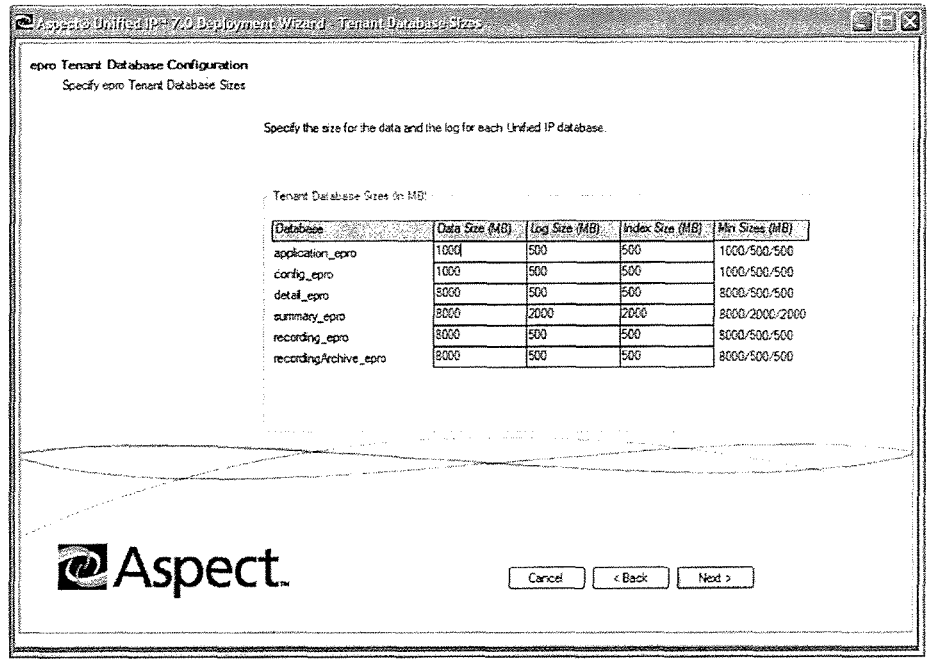
FIG. 59 depicts an interactive window for collecting information about custom database configurations used by the system of FIG. 1.

The deployment wizard 58 may then activate a database program module and present a tenant database configuration screen to the user such as that shown in FIG. 59. A column on the right may show composite recommended minimum database sizes for database utilities (e.g., application_epro, config_epro, detail_epro, summary_epro, recording_epro, recordingArchive_epro, etc.) of the customized installation, while a second, third and fourth columns may show a breakout of a data size, a log size and index size for the database utilities.

The user may individually select the data size, the log size and index size for the separate utilities and make changes as appropriate. The user may then select the NEXT softkey to close the tenant database configuration screen.

Figure 60:
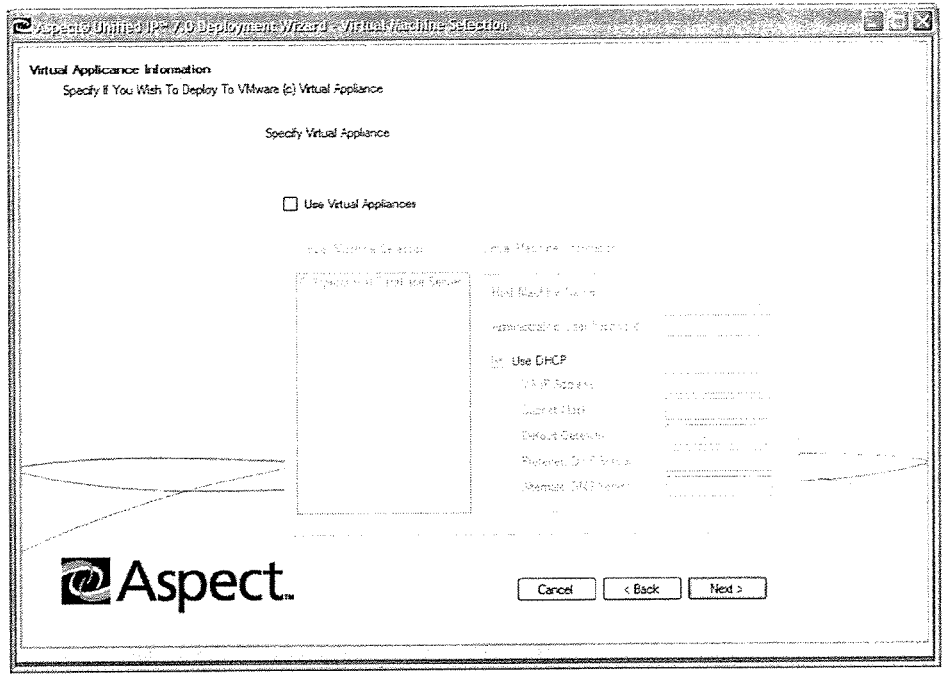
FIG. 60 depicts an interactive window on a computer screen for collecting information about custom virtual appliance configurations used by the system of FIG. 1.

Following entry of minimum database sizes on the tenant database configuration screen, the deployment wizard 58 may activate an appliance software module that may present a virtual appliance information screen such as that shown in FIG. 60. As initially displayed, the active features of the software appliance information screen may be shown in phantom until the user selects an interactive box labeled Use Virtual Appliances.

Once the user activates the Use Virtual Appliances window, the user is presented with a window on the left for selection of virtual appliances and a right window for provisioning the virtual appliance for installation within the system 12.

The left window of the software appliance information screen is a Virtual Machine Selection window and may provide a list of virtual appliances that install the tenant servers selected from previous screens. In this case, the appliance software module processes the content of the configuration file 64 to determine a scope and content of the virtual appliances needed to configure the system 12.

By processing the content of the configuration file 64, the appliance software module generates and displays a list of virtual appliances in the Virtual Machine Selection window (e.g., Operational Database Server, etc.). The user selects the virtual machine appliances within the Virtual Machine Selection window and may customize the virtual machines within a Virtual Machine Information window shown on the right side of FIG. 60.

After the user selects a virtual machine in the Virtual Machine Selection window on the left, the user may enter a host machine name in the Host Machine Name interactive box of the Virtual Machine Information window and a password within the Administrative User Password box. The user may also check a Use DCHP box if the user wishes to use a dynamic host configuration protocol addressing scheme. If the user checks the DCHP box, then the user may also enter other DCHP information (e.g., a virtual appliance IP address within a VA IP Address interactive window, a subnet mask within a Subnet Mask interactive window, a default gateway within a Default Gateway window, a preferred DNS server within a Preferred DNS Server window, an alternate DNS server within an Alternate DNS Server window, etc.).

As the user selects subsequent virtual appliances within the list shown within the Virtual Machine Selection window, the previously entered information within the Virtual Machine Information window may be shown as default values for small systems 12. The user may proceed through the list of virtual machines within the Virtual Machine Selection window entering virtual machine information for each virtual machine. Once complete, the user may activate the NEXT softkey to close the virtual appliances information window.

Figure 61:
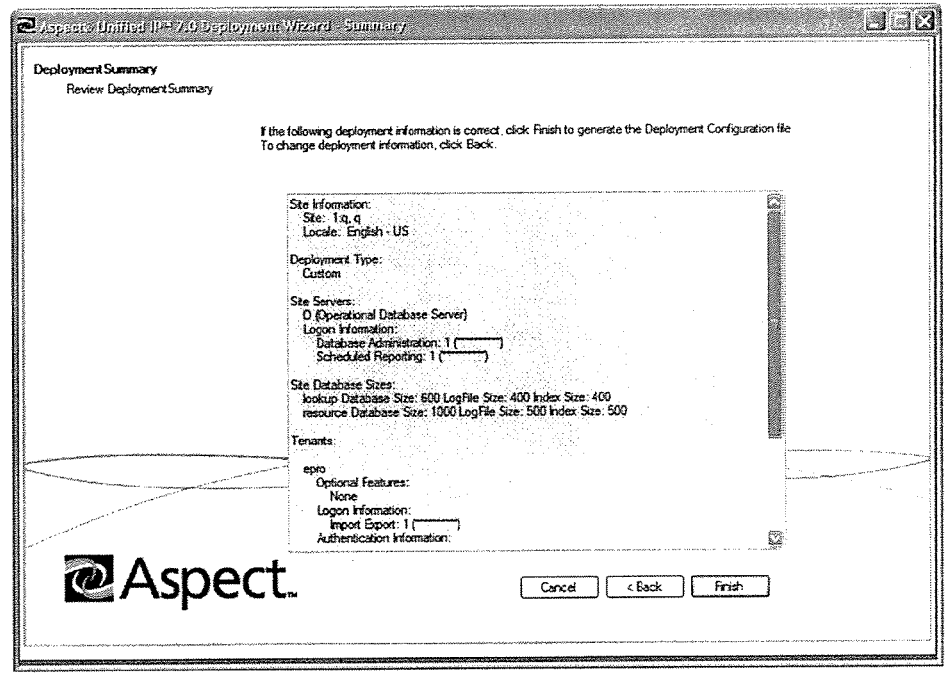
FIG. 61 depicts an interactive window with summary information generated by the system of FIG. 1.

Upon closing the virtual appliances information window, the deployment wizard 58 may activate a summary program module that may generate a summary window such as that shown in FIG. 61. The user may review the content of the summary window and go back to correct any errors by activating the BACK softkey or may complete the process by activating the FINISH softkey.

A specific embodiment of method and apparatus for collecting deployment information for a multi-tier computer operating system has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of collecting deployment information from a user for a multi-tier computer system including a plurality of inter-dependent servers comprising:
   receiving a deployment type and a deployment size of the multi-tier computer system from the user at a terminal;
   determining automatically the number of servers required and characteristics of unmodified system resources;
   identifying automatically by a host computer a set of self-contained virtual appliances, each of which provides its own operating system environment, by function based upon the deployment size and type received from the user and based upon a predetermined deployment description file wherein each virtual appliance of the set of virtual appliances incorporates a set of interface protocols for at least some of the plurality of servers defining how each server interacts with other servers of the plurality of servers and identifying automatically a set of mandatory servers based upon a function of the multi-tier system and deployment type selected by the user where each of the mandatory servers serves a predetermined function within the multi-tiered system;
   prompting the user at the terminal for a name for each identified virtual appliance based upon the deployment description file;
   collecting automatically by the host computer network information of each virtual appliance based upon the name; and
   generating automatically by the host computer a deployment configuration file for the set of virtual appliances, by prompting the user for information about the multi-tier computer system with questions automatically formulated based upon the deployment description file in conjunction with user responses, the deployment configuration file containing a set of interface protocols, collected from the multi-tier computer system for at least some of the plurality of servers, that define how the servers interact within the multi-tier computer system and defining the multi-tier computer system without entry of duplicate data by the user and which enables the interface protocols to be unincorporated into respective virtual appliances for installation of respective servers into the multi-tier computer system and thereby enabling the plurality of servers to be automatically individually installed by the virtual appliances without regard for local security and network settings.

2. The method of collecting deployment information as in claim 1 further comprising prompting the user with a plurality of possible deployment sizes.

3. The method of collecting deployment information as in claim 1 further comprising prompting the user for tenants including tenant types, tenant names and tenant optional features.

4. The method of collecting deployment information as in claim 1 wherein the network information further comprises site information selected from the group consisting of a site identifier, a site name, a site description and a site locale.

5. The method of collecting deployment information as in claim 1 wherein the network information further comprises logon information and wherein the predetermined deployment file includes at least system size and configuration options, naming convention and security options and required servers for each deployment type and size.

6. The method of collecting deployment information as in claim 1 further comprising prompting the user for login information for a database administration service.

7. The method of collecting deployment information as in claim 1 further comprising prompting the user for login information for a reporting service.

8. The method of collecting deployment information as in claim 1 further comprising prompting the user for login information for an import/export service.

9. The method of collecting deployment information as in claim 1 wherein the network information further comprises authentication information.

10. The method of collecting deployment information as in claim 9 further comprising prompting the user for an authentication type.

11. The method of collecting deployment information as in claim 1 further comprising calculating a minimum data base size and prompting for and receiving a database size selection from the user.

12. The method of collecting deployment information as in claim 1 wherein the multi-tier computer system further comprises an automatic call distributor.

13. The method of collecting deployment information as in claim 12 wherein the automatic call distributor further comprises a base site and a plurality of tenants.

14. The method of collecting deployment information as in claim 1 further comprising prompting the user for and adding components that run on a server of the multi-server computer system based upon functionality.

15. The method of collecting deployment information as in claim 14 further comprising customizing the multi-server computer system for additional functionality with the added components and wherein the deployment configuration file includes a comprehensive set of interface protocols incorporated into a virtual appliance to facilitate automatic installation of the server by a respective virtual appliance.

16. An apparatus for collecting deployment information from a user for a multi-tier computer system including a plurality of servers comprising:
   means for receiving a deployment size and a deployment type of the multi-tier computer system from the user;
   means for automatically determining the number of servers required and characteristics of unmodified system resources;
   means for identifying automatically by a host computer based upon a predetermined deployment description file a set of virtual appliances by function based upon the deployment size and type received from the user wherein each virtual appliance of the set of virtual appliances incorporates a set of interface protocols for at least some of the plurality of servers defining how each server interacts with other servers of the plurality of servers and for identifying automatically a set of mandatory servers based upon a function of the multi-tier system and a deployment type selected by the user;
   means for prompting the user for a name for each identified virtual appliance based upon the deployment description file;
   means for collecting network information of each virtual appliance based upon the name; and
   means for generating a deployment configuration file for a virtual appliance of the set of virtual appliances which defines the multi-tier computer system without need for entry of duplicate data by the user by prompting the user for information about the multi-tier system with questions automatically formulated based upon the deployment description file in conjunction with user responses and for enabling the plurality of servers to be automatically individually installed by the virtual appliance without regard to local security and network settings, the deployment configuration file containing a set of interface protocols collected from the multi-tier computer system that define how the plurality of servers interact within the multi-tier computer system and enabling the interface protocols to be incorporated into respective virtual appliances for installation of respective servers into the multi-server computer system.

17. The apparatus for collecting deployment information as in claim 16 further comprising means for prompting the user with a plurality of possible deployment sizes.

18. The apparatus for collecting deployment information as in claim 16 further comprising means for prompting the user for tenants including tenant types, tenant names and tenant optional features.

19. The apparatus for collecting deployment information as in claim 16 wherein the network information further comprises site information selected from the group consisting of a site identifier, a site name, a site description and a site locale.

20. The apparatus for collecting deployment information as in claim 16 wherein the network information further comprises logon information.

21. The apparatus for collecting deployment information as in claim 20 further comprising means for prompting the user for login information for a database administration service.

22. The apparatus for collecting deployment information as in claim 20 further comprising means for prompting the user for login information for a reporting service.

23. The apparatus for collecting deployment information as in claim 20 further comprising means for prompting the user for login information for an import/export service.

24. The apparatus for collecting deployment information as in claim 16 wherein the network information further comprises authentication information.

25. The apparatus for collecting deployment information as in claim 24 further comprising means for prompting the user for an authentication type.

26. The apparatus for collecting deployment information as in claim 16 further comprising means for calculating a minimum data base size and for prompting for and receiving a database size selection from the user.

27. The apparatus for collecting deployment information as in claim 16 wherein the multi-tier computer system further comprises an automatic call distributor.

28. The apparatus for collecting deployment information as in claim 27 wherein the automatic call distributor further comprises a base site and a plurality of tenants.

29. The apparatus for collecting deployment information as in claim 16 further comprising means for prompting the user for and adding components that run on a server of the multi-server computer system based upon functionality.

30. The apparatus for collecting deployment information as in claim 29 further comprising means for customizing the multi-server computer system for additional functionality with the added components and wherein the deployment configuration file includes a comprehensive set of interface protocols incorporated into a respected virtual appliance to facilitate automatic installation of the server by the respective virtual appliance.

31. An apparatus for collecting deployment information from a user for a multi-tier computer system including a plurality of servers comprising:

a terminal displaying a first interactive window that receives a deployment size and a deployment type of the multi-tier system from the user;

a host computer that automatically determines the number of servers required and characteristics of unmodified system resources and automatically identifies a set of virtual appliances by function based upon the deployment size received from the user and upon a predetermined deployment description file wherein each virtual appliance of the set of virtual appliances incorporates a set of interface protocols for at least some of the plurality of servers defining how each server interacts with other servers of the plurality of servers, and automatically identifying a set of mandatory servers based upon the multi-tier computer system and a deployment type selected by the user;

a plurality of interactive windows generated by the host computer that prompt the user for a name for each identified virtual appliance;

a plurality of interactive windows that collect network connection information for each virtual appliance based upon the name; and a deployment configuration file containing the names and network connection information for the set of virtual appliances and a set of interface protocols collected from the multi-tier computer for at least some of the plurality of servers that define how the servers interact with the multi-server computer system which defines the multi-tier computer system without need for entry of duplicate data by the user, the deployment configuration file including information collected by prompting the user for information about the multi-tier computer system with questions automatically formulated based upon the deployment description file in conjunction with user responses and enabling the interface protocols to be incorporated into respective virtual appliances for installation of respective servers into the multi-tier system thereby enabling the plurality of servers to be automatically individually installed by the virtual appliances without regard for local security and network settings.

32. The apparatus for collecting deployment information as in claim 31 further comprising an interactive window that prompts the user with a plurality of possible deployment sizes.

33. The apparatus for collecting deployment information as in claim 32 further comprising an interactive window that prompts the user for tenants including tenant types, tenant names and tenant optional features.

34. The apparatus for collecting deployment information as in claim 31 wherein the network information further comprises site information selected from the group consisting of a site identifier, a site name, a site description and a site locale.

35. The apparatus for collecting deployment information as in claim 31 wherein the network information further comprises logon information.

36. The apparatus for collecting deployment information as in claim 35 further comprising an interactive window that prompts the user for login information for a database administration service.

37. The apparatus for collecting deployment information as in claim 35 further comprising an interactive window that prompts the user for login information for a reporting service.

38. The apparatus for collecting deployment information as in claim 35 further comprising an interactive window that prompts the user for login information for an import/export service.

39. The apparatus for collecting deployment information as in claim 31 wherein the network information further comprises authentication information.

40. The apparatus for collecting deployment information as in claim 39 further comprising an interactive window that prompts the user for an authentication type.

41. The apparatus for collecting deployment information as in claim 31 further comprising the host computer calculating a minimum data base size and generating an interactive window that prompts for and receiving a database size selection from the user.

42. The apparatus for collecting deployment information as in claim 31 wherein the multi-tier computer system further comprises an automatic call distributor.

43. The apparatus for collecting deployment information as in claim 42 wherein the automatic call distributor further comprises a base site and a plurality of tenants.

44. The apparatus for collecting deployment information as in claim 31 further comprising an interactive window that prompts the user for and adds components that run on a server of the multi-server computer system based upon functionality.

45. The apparatus for collecting deployment information as in claim 44 further comprising the host computer for customizing the multi-server computer system for additional functionality with the added components and the deployment configuration file including interface protocols incorporated into a respective virtual appliance to facilitate automatic installation of the server by the respective virtual appliance.

\* \* \* \* \*